(12) United States Patent
Ninan et al.

(10) Patent No.: US 10,726,574 B2
(45) Date of Patent: Jul. 28, 2020

(54) PASSIVE MULTI-WEARABLE-DEVICES TRACKING

(71) Applicant: Dolby Laboratories Licensing Corporation, San Francisco, CA (US)

(72) Inventors: Ajit Ninan, San Jose, CA (US); Neil Mammen, San Jose, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 283 days.

(21) Appl. No.: 15/949,536

(22) Filed: Apr. 10, 2018

(65) Prior Publication Data

US 2018/0293752 A1    Oct. 11, 2018

Related U.S. Application Data

(60) Provisional application No. 62/484,131, filed on Apr. 11, 2017.

(51) Int. Cl.
*G06T 7/70*      (2017.01)
*G02B 27/01*     (2006.01)
(Continued)

(52) U.S. Cl.
CPC ............ *G06T 7/70* (2017.01); *G02B 27/0093* (2013.01); *G02B 27/0172* (2013.01); *G02B 27/0179* (2013.01); *G02B 30/24* (2020.01); *G02B 30/25* (2020.01); *G06F 3/011* (2013.01); *G06F 3/0308* (2013.01); *G06T 7/285* (2017.01);
(Continued)

(58) Field of Classification Search
CPC ........... G06T 7/70; G06T 7/521; G06T 7/285; G06T 7/593; G06T 19/006; G06T 2207/10012; G06T 2207/10028; G06T 2207/10021; G02B 30/24-25; G02B 27/0093; G02B 27/0172; G02B 27/0179; G02B 27/017; G02B 2027/014; G02B 2027/0138; G02B 2027/0187; G02B 2027/0178; G06F 3/011; G06F 3/012; G06F 3/013; G06F 3/0308; G06F 3/0325; H04N 13/239; H04N 13/254; H04N 13/271; H04N 13/344; H04N 13/204; H04N 13/243;
(Continued)

(56) References Cited

U.S. PATENT DOCUMENTS 9,602,811 B2 *   3/2017  Hillebrand ........... H04N 13/243
10,091,492 B2 *  10/2018 Dielacher ............. G01S 17/08
(Continued)

FOREIGN PATENT DOCUMENTS

WO        2018/191312        10/2018

*Primary Examiner* — Michael S Osinski

(57) ABSTRACT

At a first time point, a first light capturing device at a first spatial location in a three-dimensional (3D) space captures first light rays from light sources located at designated spatial locations on a viewer device in the 3D space. At the first time point, a second light capturing device at a second spatial location in the 3D space captures second light rays from the light sources located at the designated spatial locations on the viewer device in the 3D space. Based on the first light rays captured by the first light capturing device and the second light rays captured by the second light capturing device, at least one of a spatial position and a spatial direction, at the first time point, of the viewer device is determined.

23 Claims, 12 Drawing Sheets

(51) Int. Cl.
*G02B 27/00* (2006.01)
*G06T 7/285* (2017.01)
*G06F 3/01* (2006.01)
*G06T 7/521* (2017.01)
*G06F 3/03* (2006.01)
*G06T 7/593* (2017.01)
*G02B 30/24* (2020.01)
*G02B 30/25* (2020.01)

(52) U.S. Cl.
CPC .............. *G06T 7/521* (2017.01); *G06T 7/593* (2017.01); *G02B 2027/014* (2013.01); *G02B 2027/0134* (2013.01); *G02B 2027/0138* (2013.01); *G02B 2027/0178* (2013.01); *G02B 2027/0187* (2013.01)

(58) Field of Classification Search
CPC .... H04N 13/117; H04N 13/296; H04N 5/247; H04N 5/2256
See application file for complete search history.

(56) References Cited

U.S. PATENT DOCUMENTS

| | | | |
|---|---|---|---|
| 10,310,265 B2* | 6/2019 | Giwnewer | G02B 27/02 |
| 10,460,509 B2* | 10/2019 | Lakshman | G09G 3/003 |
| 10,497,175 B2* | 12/2019 | Mount | G06T 7/70 |
| 2009/0225218 A1* | 9/2009 | Sugimori | H04N 5/23232 348/370 |
| 2011/0193969 A1* | 8/2011 | Tsai | G06F 3/0428 348/169 |
| 2012/0045100 A1* | 2/2012 | Ishigami | G06T 7/73 382/106 |
| 2012/0206443 A1* | 8/2012 | Kimura | G02B 6/00 345/419 |
| 2013/0293684 A1* | 11/2013 | Becker | G01B 11/245 348/47 |
| 2013/0321586 A1* | 12/2013 | Kirk | H04N 13/257 348/47 |
| 2014/0306874 A1* | 10/2014 | Finocchio | G06F 3/017 345/156 |
| 2014/0368625 A1* | 12/2014 | Lin | H04N 13/324 348/60 |
| 2015/0002639 A1* | 1/2015 | Kwon | H04N 13/254 348/47 |
| 2015/0009182 A1* | 1/2015 | Kuba | G06F 3/0421 345/175 |
| 2015/0055937 A1* | 2/2015 | Van Hoff | G06F 3/04815 386/285 |
| 2015/0146168 A1* | 5/2015 | Divo | A61B 3/0091 351/204 |
| 2015/0292884 A1* | 10/2015 | Fuchikami | H04N 5/232 348/135 |
| 2015/0378441 A1* | 12/2015 | Nishioka | G06F 3/0421 345/156 |
| 2016/0069999 A1* | 3/2016 | Lee | F21V 29/70 356/5.01 |
| 2016/0113486 A1* | 4/2016 | Ninomiya | A61B 3/0025 351/210 |
| 2016/0170486 A1* | 6/2016 | Rydberg | G06K 9/00604 348/78 |
| 2016/0248957 A1* | 8/2016 | Kim | B60K 28/02 |
| 2016/0267647 A1* | 9/2016 | Higo | G06T 7/0004 |
| 2017/0134717 A1* | 5/2017 | Trail | H04N 13/128 |
| 2017/0146803 A1* | 5/2017 | Kishigami | G02B 5/30 |
| 2017/0156590 A1* | 6/2017 | Kawauchi | A61B 3/113 |
| 2017/0324949 A1* | 11/2017 | Chen | H04N 13/239 |
| 2018/0007258 A1* | 1/2018 | Seko | H04N 5/23203 |
| 2018/0045816 A1* | 2/2018 | Jarosinski | G01S 7/4863 |
| 2018/0081178 A1 | 3/2018 | Shpunt | |
| 2018/0135975 A1* | 5/2018 | Ohyama | G01N 21/9501 |
| 2018/0180711 A1* | 6/2018 | Chen | G01S 11/16 |
| 2018/0227562 A1* | 8/2018 | Bleyer | H04N 5/3532 |
| 2018/0253856 A1* | 9/2018 | Price | G01S 7/4815 |
| 2018/0295351 A1 | 10/2018 | Ninan | |
| 2018/0295352 A1 | 10/2018 | Ninan | |
| 2018/0316872 A1* | 11/2018 | Wada | H04N 5/232939 |
| 2018/0329484 A1* | 11/2018 | Steedly | A63F 13/211 |
| 2018/0372869 A1* | 12/2018 | Namba | B60R 21/013 |
| 2018/0374227 A1* | 12/2018 | Varekamp | G06T 7/586 |
| 2019/0101977 A1* | 4/2019 | Armstrong-Muntner | G06F 3/012 |
| 2019/0124244 A1* | 4/2019 | Knoll | H04N 5/33 |
| 2019/0147241 A1* | 5/2019 | Shudo | G06K 9/00255 348/78 |
| 2019/0339356 A1* | 11/2019 | Schildknecht | G01S 5/16 |
| 2020/0011995 A1* | 1/2020 | Send | G01S 7/4817 |
| 2020/0053343 A1* | 2/2020 | Bae | G06K 9/00597 |

* cited by examiner capture, by a first light capturing device at a first spatial location in a 3D space, first light rays from light sources located at designated spatial locations on a viewer device in the 3D space 402 capture, by a second light capturing device at a second spatial location in the 3D space, second light rays from the light sources 404 determine a spatial position or a spatial direction of the viewer device 406

FIG. 4

PASSIVE MULTI-WEARABLE-DEVICES TRACKING

CROSS-REFERENCE TO RELATED APPLICATION(S)

This application claims the benefit of priority to U.S. Provisional Patent Application No. 62/484,131 filed Apr. 11, 2017, which are incorporated herein by reference in its entirety.

TECHNOLOGY

The present invention relates generally to device tracking, and in particular, to passive multi-wearable-devices tracking.

BACKGROUND

Wearable devices may be used in a wide variety of display applications such as those related to virtual reality (VR) and augmented reality (AR), mixed reality (MR), telepresence, telemedicine, 3D video, omnidirectional video, etc. Such a display application can render or display imagery depicting a virtual or augmented world to a viewer of a wearable device, and represent the viewer at a specific spatial position and a specific viewing angle in the virtual or augmented world. To add dynamism and interaction into viewer experience, the application can directly or indirectly monitor physical movements of the wearable device or the viewer, and change spatial positions and viewing angles of the viewer in the virtual or augmented world based on actual physical movements of the wearable device or the viewer.

However, it can be difficult to accurately, reliably and responsively track physical movements of a single wearable device or a single viewer. Components used for tracking purposes should be miniaturized into relatively tiny footprints and mechanically, electrically or optically incorporated into an overall relatively small form factor of the wearable device. Low-latency data communication should be provisioned and configured in relation to these device tracking components. Complex device tracking algorithms should be designed, perfected, and implemented. Given the challenges for device tracking involving only a single wearable device, it can be especially difficult to concurrently track a relatively large number of wearable devices accurately, reliably and responsively.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 1B illustrates an example angular vision field representation of the eye;

FIG. 4 illustrates an example process flow; and

DESCRIPTION OF EXAMPLE EMBODIMENTS

Figure 1A:
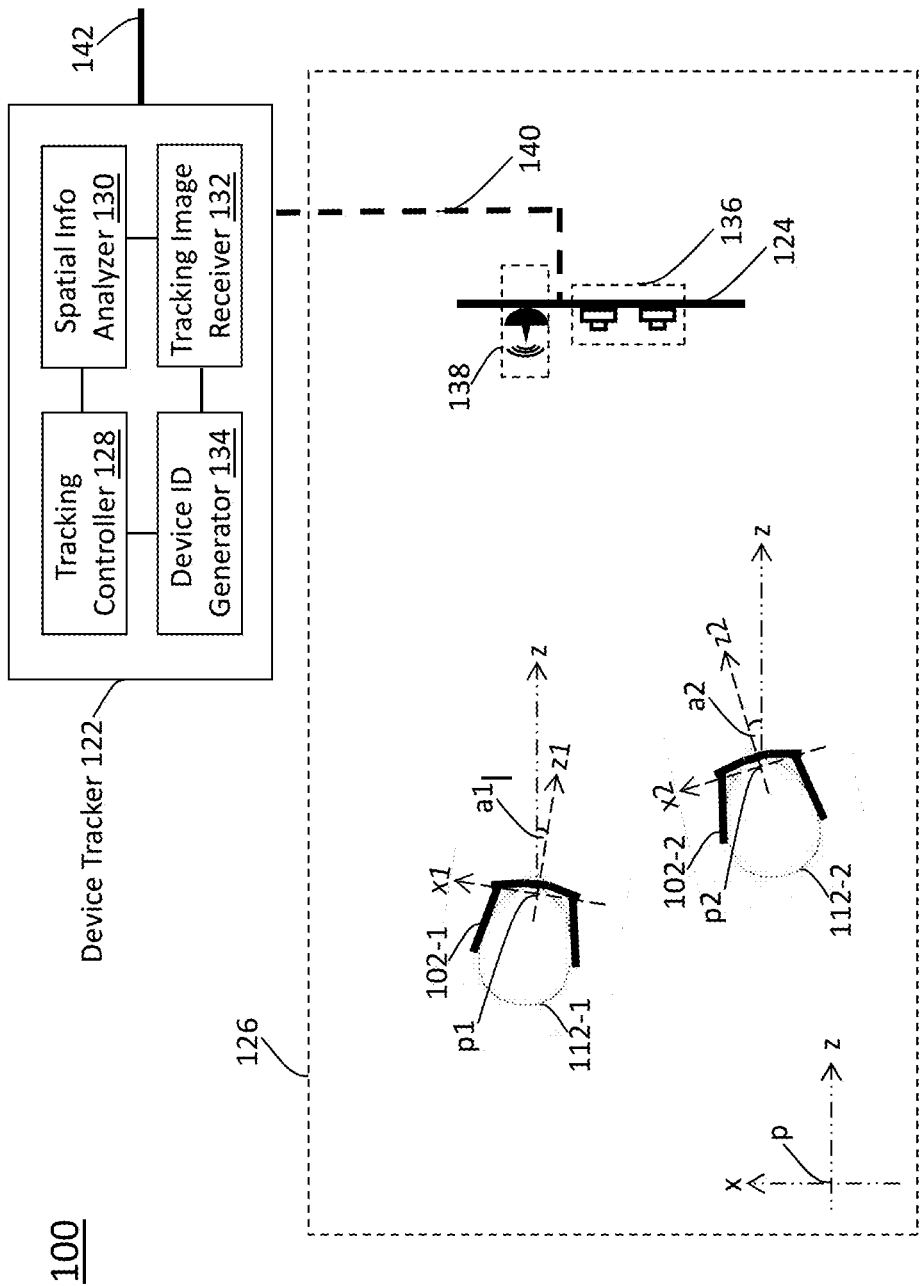
FIG. 1A through FIG. 1C illustrate example configurations in which spatial positions and/or spatial directions of wearable devices in a 3D space may be tracked or monitored by a passive multi-wearable-devices tracking system.

Example embodiments, which relate to passive multi-wearable-devices tracking, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. PASSIVE MULTI-WEARABLE-DEVICES TRACKING SYSTEM
3. ADDITIONAL EXAMPLE SYSTEM CONFIGURATIONS
4. EXAMPLE WEARABLE DEVICES
5. EXAMPLE 3D SPACES
6. TRACKING IMAGE SENSOR CALIBRATIONS
7. ANALYZING TRACKING IMAGES
8. EXAMPLE PROCESS FLOWS
9. IMPLEMENTATION MECHANISMS—HARDWARE OVERVIEW
10. EQUIVALENTS, EXTENSIONS, ALTERNATIVES AND MISCELLANEOUS

1. General Overview

This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below. Note that, although separate embodiments are discussed herein, any combination of embodiments and/or partial embodiments discussed herein may be combined to form further embodiments.

Techniques as described herein can be used to provide device tracking in a wide variety of systems in connection with an augmented entertainment application, a 3D display application, an omnidirectional video application, a VR application, an AR application, a remote presence application, a display application, etc. These device tracking techniques can be used to track or monitor spatial positions and/or spatial directions of a wide variety of movable or non-movable devices, such as wearable devices, handheld devices, eyewear devices, head-mounted devices, etc. Example wearable devices can be found in U.S. Provisional Patent Application No. 62/484,157, with an application title of "AUGMENTED 3D ENTERTAINMENT SYSTEMS" by Ajit Ninan and Neil Mammen, filed on Apr. 11, 2017, the entire contents of which are hereby incorporated by reference as if fully set forth herein.

The techniques as described herein can operate in a wide range of scenarios in which up to a relatively large number of viewers may be concurrently watching (e.g., cinema, etc.) image content on a shared display such a cinema display, and simultaneously watching device image content rendered with individual wearable devices of individual viewers, as supported by an augmented entertainment system. Spatial positions and/or spatial directions of the wearable devices tracked/monitored under techniques as described herein can be used to adapt the device image content to depict a seamless image space with the image content on the shared display. Example augmented entertainment systems can be found in U.S. Provisional Patent Application No. 62/484,121, with an application title of "LAYERED AUGMENTED ENTERTAINMENT EXPERIENCES" by Ajit Ninan, Neil Mammen and Tyrome Brown, filed on Apr. 11, 2017, the entire contents of which are hereby incorporated by reference as if fully set forth herein.

Light sources such as light emitters, light reflectors, etc., may be placed (e.g., installed, inserted, etc.) on the wearable devices at designated spatial positions stationary to the wearable devices. For example, a light emitter emitting blinking LED light may be placed on a top bar or a bridge of an eyeglass frame in a wearable device. Light reflectors such as shining stickers may be placed on rims of the eyeglass frame.

Light rays emitted or reflect/redirected off from the light sources may be captured by a device tracker operating in conjunction with one or more tracking sensor assemblies deployed in a 3D space in which the wearable devices are located. The light rays may be digitally coded (e.g., through pulse-width modulation, pulse-code modulation, pulse-amplitude modulation, pulse-density modulation, a combination of any of the foregoing, etc.) with device ID information. Additionally, optionally or alternatively, light sources, radio-frequency (RF) emitters, infrared light emitters, etc., may be placed or installed in designated spatial positions (e.g., seating spaces, backs of seats in a cinema, etc.) around the wearable devices. Light rays, RF signals, infrared signals, etc., emitted by these devices may be captured by the device tracker operating in conjunction with the tracking sensor assemblies to determine device ID information of the wearable devices or any other information related to the wearable devices or viewers of the wearable devices.

The light rays from the light sources on or around the wearable devices may be acquired/captured with the tracking sensor assemblies into device tracking images. Tracking image sensors used to acquire the device tracking images may be calibrated so that spatial relationships between a sensor-specific coordinate system originated at (e.g., centers of, etc.) each of the tracking image sensors and a reference coordinate system in the 3D space are determined (e.g., as matrixes, tensors, offsets, etc.). Some or all of the following tracking sensor properties may be determined based on calibration: a focal length of the tracking image sensor, pixel magnification factors, image skews, image radial distortions, a linear displacement/position of the sensor-specific coordinate system of the tracking image sensor in reference to the reference coordinate system in the 3D space, an angular displacement/position of the sensor-specific coordinate system of the tracking image sensor in reference to the reference coordinate system in the 3D space, etc.

Based on some or all of the tracking image sensor properties and the device tracking images that contain image portions generated in response to the light rays from the light sources of the wearable devices, spatial coordinate values indicating spatial positions and/or spatial directions of the wearable devices may be determined, computed, or estimated, in real time. For example, two, three, ten, etc., of tracking image sensors may be deployed at different spatial locations in the 3D space. Device tracking images generated with these tracking image sensors distributed in the 3D space may be used to identify light rays in the 3D space that generate corresponding image portions. These light rays from different tracking image sensors may be determined or identified in the 3D space to determine light sources emitting the light rays and spatial coordinate values of the light sources.

Example embodiments described herein relate to rendering device tracking methods. At a first time point first light rays from a plurality of light sources located at a plurality of designated spatial locations on a viewer device in a three-dimensional (3D) space is captured by a first light capturing device at a first spatial location in the 3D space. At the first time point, second light rays from the plurality of light sources located at the plurality of designated spatial locations on the viewer device in the 3D space is captured by a second light capturing device at a second spatial location in the 3D space. Based on the first light rays captured by the first light capturing device and the second light rays captured by the second light capturing device, at least one of a spatial position and a spatial direction, at the first time point, of the viewer device is determined.

In some example embodiments, mechanisms as described herein form a part of a media processing system, including but not limited to any of: cloud-based server, mobile device, virtual reality system, augmented reality system, head up display device, helmet mounted display device, CAVE-type system, wall-sized display, video game device, display device, media player, media server, media production system, camera systems, home-based systems, communication devices, video processing system, video codec system, studio system, streaming server, cloud-based content service system, a handheld device, game machine, television, cinema display, laptop computer, netbook computer, tablet computer, cellular radiotelephone, electronic book reader, point of sale terminal, desktop computer, computer workstation, computer server, computer kiosk, or various other kinds of terminals and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Passive Multi-Wearable-Devices Tracking System

FIG. 1A illustrates an example configuration 100 in which spatial positions and/or spatial directions of wearable devices (e.g., 102-1, 102-2, etc.) in a 3D space (e.g., 126, etc.) may be tracked or monitored by a passive multiwearable-devices tracking system. As illustrated, the passive multi-wearable-devices tracking system comprises a device tracker 122, a tracking sensor assembly 124, etc. Some or all of the components/devices as depicted in FIG. 1A may be implemented by one or more mechanical components, one or more electrooptical components, one or more computing devices, modules, units, etc., in software, hardware, a combination of software and hardware, etc. Some or all of the components/devices as depicted in FIG. 1A may be communicatively (e.g., wirelessly, with wired connections, etc.) coupled with some other components/devices as depicted in FIG. 1A or with other components/devices not depicted in FIG. 1A.

The device tracker (122) can be collocated, or even integrated as a single device, with the tracking sensor assembly (124). Additionally, optionally or alternatively, the device tracker (122) can be remote from the tracking sensor assembly (124). The device tracker (122) is operatively linked with the tracking sensor assembly (124) over one or more sensor data communication links 140. Example sensor data communication links may include, but are not necessarily limited to only, any combination of one or more of: wireless connections, wired connections, local network connections, wide area network connections, etc.

In some embodiments, the device tracker (122) comprises a tracking controller (128), a spatial information analyzer 130, a device ID generator 134, a tracking image receiver 132, etc. In some embodiments, the tracking sensor assembly (124) comprises one or more tracking image sensors 136, one or more tracking ID sensors 138, etc.

In some embodiments, the tracking assembly (124) is deployed (e.g., installed on, affixed to, etc.) in the 3D space (126) in which a plurality of wearable devices (e.g., 102-1, 102-2, etc.) used by a plurality of viewers (e.g., 112-1, 112-2, etc.) is located. The tracking device (122) operates with the tracking assembly (124) to track/monitor spatial positions and/or spatial directions of each wearable device in the plurality of wearable devices (e.g., 102-1, 102-2, etc.) in the 3D space (126) in real time or in near real time.

Examples of the 3D space (126) may include, but are not necessarily limited to only, any of: a reference 3D space, a cinema, a theater, a concert hall, an auditorium, an amusement park, a bar, a home, a room, an exhibition hall, a venue, a bar, a ship, an airplane, etc. The 3D space (126) may represent a three-dimensional volume, spatial positions in which can be represented in a reference three-dimensional coordinate system that is stationary relative to the 3D space (126).

By way of illustration but not limitation, the reference three-dimensional coordinate system used to represent spatial positions in the 3D space (126) may be a reference Cartesian coordinate system (e.g., a world coordinate system, etc.) depicted in the lower left corner of the 3D space (126). FIG. 1A depicts only two example spatial dimensions, namely an x-axis and a z-axis, of the reference Cartesian coordinate system; the reference Cartesian coordinate system may comprise another spatial dimension, namely a y-axis orthogonal to both the x and z axes, that points out from FIG. 1A. The reference Cartesian coordinate system may comprise a coordinate system origin at a reference spatial position denoted as "p" as shown in FIG. 1A. The reference spatial position may be selected from any spatial position stationary to the 3D space (126).

The wearable devices (e.g., 102-1, 102-2, etc.) tracked/monitored by the device tracker (122) may, but are not necessarily limited to only, to be rigid-body (or fixed spatial shaped) devices in operation. Spatial positions on the wearable devices (e.g., 102-1, 102-2, etc.) can be represented in device-stationary three-dimensional device-stationary coordinate systems that are respectively stationary relative to the wearable devices (e.g., 102-1, 102-2, etc.).

For example, a first device-stationary Cartesian coordinate system stationary to a first wearable device 102-1 can be used to represent spatial positions on the first wearable device (102-1). The first device-stationary Cartesian coordinate system comprises three spatial dimensions represented by respective axes including an x1-axis and a z1-axis as shown in FIG. 1A, and a y1-axis orthogonal to both the x1 and z1 axes that is not depicted in FIG. 1A. The first device-stationary Cartesian coordinate system may comprise a coordinate system origin at a first spatial position denoted as "p1" as shown in FIG. 1A. The first spatial position "p1" may be selected from any spatial position stationary to the first wearable device (102-1). In some embodiments, if there is a spatial location that is a point of symmetry on the first wearable device (102-1), then such spatial location may be selected as the first position "p1" to serve as the coordinate origin to the first device-stationary Cartesian coordinate system.

Likewise, a second device-stationary Cartesian coordinate system stationary to a second wearable device 102-2 can be used to represent spatial positions on the second wearable device (102-2). The second device-stationary Cartesian coordinate system comprises three spatial dimensions represented by respective axes including an x2-axis and a z2-axis as shown in FIG. 1A, and a y2-axis orthogonal to both the x2 and z2 axes that is not depicted in FIG. 1A. The second device-stationary Cartesian coordinate system may comprise a coordinate system origin at a second spatial position denoted as "p2" as shown in FIG. 1A. The second spatial position "p2" may be selected from any spatial position stationary to the second wearable device (102-2). In some embodiments, if there is a spatial location that is a point of symmetry on the second wearable device (102-2), then such spatial location may be selected as the first position "p2" to serve as the coordinate origin to the second device-stationary Cartesian coordinate system.

In some embodiments, a wearable device (e.g., 102-1, 102-2, etc.) as described herein has one or more light sources removably or irremovably installed on, or otherwise attached to, designated spatial positions on one or more rigid parts of the wearable device. Some or all of the one or more light sources on the wearable device (e.g., 102-1, 102-2, etc.) may represent, or may be deemed as, point light sources. A point light source may refer to a light source that emits or reflects/redirects light rays from a relatively defined spatial point or from within a spatial area size whose diameter is much smaller (e.g., less than 10%, less than 5%, etc.) than an interpupil distance between left and right eyes of a viewer of the wearable device (e.g., 102-1, 102-2, etc.). For a non-point light source that may have a spatial size comparable (e.g., more than 20%, more than 10%, etc.) to the interpupil distance, a specific point such as a center point on the light source may be selected or used to represent the spatial location of the light source.

When the wearable device (e.g., 102-1, 102-2, etc.) is in operation, the one or more light sources may be stationary to the wearable device (e.g., 102-1, 102-2, etc.) and located at respective designated spatial positions on the wearable device (e.g., 102-1, 102-2, etc.). These designated spatial positions of the wearable device (e.g., 102-1, 102-2, etc.) may be represented with spatial coordinate values in a device-stationary Cartesian coordinate system stationary to the wearable device (e.g., 102-1, 102-2, etc.). The coordinate values of the designated spatial positions of the light sources on the wearable device (e.g., 102-1, 102-2, etc.) may be stored as a part of device configuration information for the wearable device (e.g., 102-1, 102-2, etc.) and made accessible to the device tracker (122).

The device tracker (122) can use the coordinates values (e.g., static values, etc.) of the designated spatial positions of the light sources in the device-specific Cartesian coordinate system in combination with coordinate values (e.g., dynamic values, acquired in real time or in near real time, etc.) of the designated spatial positions of the light sources in the reference Cartesian coordinate system to determine spatial positions and/or spatial directions of the wearable device (e.g., 102-1, 102-2, etc.) in real time or in near real time.

The light sources on the wearable device (e.g., 102-1, 102-2, etc.) may emit or reflect off light rays such as light rays of visible light wavelengths, light rays of invisible light wavelengths, infrared lights, etc. Examples of light sources may include, but are not necessarily limited to only, any of: light emitters, light emitting diodes (LEDs), non-LED lights, light regenerators, light reflectors, light scattering devices, retroreflectors, etc. By way of example but not limitation, light sources on the wearable device (e.g., 102-1, 102-2, etc.) emit or reflect off invisible light such as infrared light, etc., for device tracking purposes.

In some embodiments, the tracking image sensors (136) generates device tracking images generated by sensor-captured light rays from light sources placed on each wearable device in the plurality of wearable devices (e.g., 102-1, 102-2, etc.) in the 3D space (126). These light rays may be emitted, or reflected/redirected/scattered by the light sources on the wearable devices (e.g., 102-1, 102-2, etc.) toward the tracking image sensors (124). These light rays may be captured continuously, at a set time schedule, etc. For example, the device tracking images may be taken at a time resolution of a millisecond or a fraction of millisecond, at a time resolution of every hundredth second, at a time resolution of every tenth second, etc.

In some embodiments, the device tracker (122) repeatedly (e.g., in real time, in near real time, within a strict timing budget, every 1 millisecond, every 2 milliseconds, etc.) tracks or determines one or more spatial coordinates of one or more light sources on each of the wearable devices (e.g., 102-1, 102-2, etc.) at a given time point in the reference Cartesian coordinate system of the 3D space (126) based on one or more device tracking images captured at the given time point by the tracking image sensors (136) from light rays from the one or more light sources of the wearable devices (e.g., 102-1, 102-2, etc.).

For example, the tracking image receiver (132) can collect the one or more device tracking images captured at the given time point by the tracking image sensors (136) over the data communication links (140). The spatial information analyzer (130) can track or determine one or more specific spatial coordinates of each light source of the one or more light sources on the wearable device (e.g., 102-1, 102-2, etc.) at the given time point in the reference Cartesian coordinate system of the 3D space (126) based on specific image portions generated with light rays from such each light source in one or more device tracking images.

The spatial coordinates, of the one or more light sources on the wearable device (e.g., 102-1, 102-2, etc.), at the given time point in the reference Cartesian coordinate system of the 3D space (126), may be used to derive spatial coordinates, at the given time point in the reference Cartesian coordinate system of the 3D space (126), of any given spatial location that is stationary to the wearable device (e.g., 102-1, 102-2, etc.).

In an example, a first light source on the first wearable device (102-1) may be located at the first coordinate origin "p1" in the first device-stationary Cartesian coordinate system; the first coordinate origin may be used to represent the spatial location of the first wearable device (102-1). Thus, spatial coordinates of the spatial location of the first wearable device (102-1), or the first coordinate origin "p1", at the given time point in the reference Cartesian coordinate system of the 3D space (126), are derived as soon as spatial coordinates of the first light source on the first wearable device (102-1), at the given time point in the reference Cartesian coordinate system of the 3D space (126), are derived.

In another example, two, three, four or more light sources may be installed on or otherwise attached to the first wearable device (102-1). Designated spatial locations of these light sources on the first wearable device (102-1) may form an imaginary rigid geometric structure (e.g., a line, a triangle, a tetrahedron, etc.) stationary to the first wearable device (102-1). A representative spatial location such as "p1" of the first wearable device (102-1) may have a deterministic spatial relationship with the geometric structure formed by the designated spatial locations of the light sources on the wearable device (102-1).

This deterministic spatial relation between the representative spatial location "p1" of the first wearable device (102-1) and the geometric structure formed by the designated spatial locations of the light sources on the wearable device (102-1) may be used to deduce spatial coordinates of the representative spatial location "p1" of the first wearable device (102-1), at the given time point in the reference Cartesian coordinate system of the 3D space (126), once spatial coordinates, of the two, three, four or more light sources on the first wearable device (102-1), at the given time point in the reference Cartesian coordinate system of the 3D space (126), are determined.

The foregoing operations applied to determining the spatial coordinates of a representative spatial location such as "p1" of the first wearable device (102-1) at any given time point in the reference Cartesian coordinate system of the 3D space (126) can also be applied to determining spatial coordinates of a representative spatial location of any other wearable device (e.g., 102-2, etc.) at any given time point in the reference Cartesian coordinate system of the 3D space (126).

Additionally, optionally or alternatively, spatial coordinates of a representative spatial location (e.g., "p1", "p2", etc.) of a wearable device (e.g., 102-1, 102-2, etc.) over time constitute a spatial trajectory of the wearable device (e.g., 102-1, 102-2, etc.), and may be represented as functions of time. Any combination of one or more motion characteristics of the wearable device (e.g., 102-1, 102-2, etc.) may be determined from these functions of time representing the spatial trajectory of the wearable device (e.g., 102-1, 102-2, etc.).

For example, linear positions/displacements (over time) of the wearable device (e.g., 102-1, 102-2, etc.) in relation to a reference point—such as the origin "p" of the reference Cartesian coordinate system—stationary in the 3D space (126) may be determined or derived (e.g., as a vector difference, etc.) from the spatial trajectory (represented by the functions of time as previously mentioned) of the wearable device (e.g., 102-1, 102-2, etc.). Additionally, optionally or alternatively, linear velocities, speeds, accelerations, etc., (over time) of the wearable device (e.g., 102-1, 102-2, etc.) in relation to the reference point stationary in the 3D space (126) may be determined or derived (e.g., as a first-order derivative, as a second-order derivative, etc.) from the spatial trajectory of the wearable device (e.g., 102-1, 102-2, etc.).

Similarly, angular positions/displacements (e.g., a1, a2, etc.) (e.g., over time, at any given time, etc.) of the wearable device (e.g., 102-1, 102-2, etc.) in relation to a reference rigid geometric structure—such as the reference Cartesian coordinate system—stationary in the 3D space (126) may be determined or derived from the spatial locations of the light sources of the wearable device (e.g., 102-1, 102-2, etc.).

For example, the spatial coordinates of the rigid geometric structure as defined by the designated spatial locations of the light sources on the wearable device (e.g., a1, a2, etc.) (e.g., 102-1, 102-2, etc.) may be used to deduce or derive the angular positions/displacements (over time) of the wearable device (e.g., 102-1, 102-2, etc.) in relation to the reference Cartesian coordinate system in the 3D space (126). The first device-stationary Cartesian coordinate system of the first wearable device (102-1) may have a deterministic spatial relationship with the geometric structure formed by the designated spatial locations of the light sources on the wearable device (102-1).

This deterministic spatial relation between the first device-stationary Cartesian coordinate system of the first wearable device (102-1) and the geometric structure formed by the designated spatial locations of the light sources on the wearable device (102-1) may be used to deduce angular displacements (e.g., pitch, yaw, roll, etc.) of the first device-stationary Cartesian coordinate system of the first wearable device (102-1), at the given time point in relation to the reference Cartesian coordinate system of the 3D space (126), once spatial coordinates, of the two, three, four or more light sources on the first wearable device (102-1), at the given time point in the reference Cartesian coordinate system of the 3D space (126), are determined (thereby determining the orientation of the geometric structure in relation to the reference Cartesian coordinate system).

Additionally, optionally or alternatively, linear or angular velocities, speeds, accelerations, etc., (over time) of the wearable device (e.g., 102-1, 102-2, etc.) in relation to the reference point stationary in the 3D space (126) or in relation to the reference Cartesian coordinate system in the 3D space (126) may be determined or derived (e.g., as a first-order derivative, as a second-order derivative, etc.) from the linear or angular positions/displacements (e.g., p1, p2, a1, a2, etc.) of the wearable device (e.g., 102-1, 102-2, etc.).

In some embodiments, the device tracker (122) repeatedly (e.g., in real time, in near real time, within a strict timing budget, every 1 millisecond, every 2 milliseconds, etc.) tracks or determines device ID information of each of the wearable devices (e.g., 102-1, 102-2, etc.) based on one or more device ID signals captured by the one or more tracking ID sensors (138) from the wearable devices (e.g., 102-1, 102-2, etc.).

For example, the one or more device ID signals may be digitally encoded with device ID information of the wearable devices (e.g., 102-1, 102-2, etc.). In some embodiments, the one or more light sources of the wearable devices (e.g., 102-1, 102-2, etc.) may comprise one or more light emitters. The light ray emission by the light emitters may be specifically modulated such that light rays emitted by the light emitters represent also the one or more device ID signals digitally encoded with the device ID information of the wearable devices (e.g., 102-1, 102-2, etc.). Sensor data can be captured by the tracking ID sensors (138) in response to the light rays emitted by the light emitters and sent to the device tracker (122) over the data communication links (140). The device ID generator (134) can generate or retrieve the one or more device ID signals from the sensor data. The tracking controller (128) can further track or determine the device ID information of the wearable device (e.g., 102-1, 102-2, etc.) by decoding the one or more device ID signals. Examples of device ID information of the wearable device (e.g., 102-1, 102-2, etc.) may include, but are not necessarily limited to only, a computer network address, a MAC address, an IP address, a unique device code, vendor identification information, model number, manufacturing information, etc., of the wearable device (e.g., 102-1, 102-2, etc.), other device-specific information, non-device-specific information, etc.

In some embodiments, the device tracker (122) outputs some or all of spatial coordinates of each of the wearable devices over a time duration, a session, a sequence of (e.g., evenly spaced, unevenly spaced, etc.) time points over one or more tracking data communication links 142 to any combination of one or more of: local or remote memory space, data storage media, recipient components/devices within the device tracker (122), recipient devices outside of the device tracker (122), etc. The one or more tracking data communication links (142) may be implemented with any combination of one or more of: wireless connections, wired connections, etc. Additionally, optionally or alternatively, the device tracker (122) outputs some or all of device ID information of each of the wearable devices over the one or more tracking data communication links (142) to any combination of one or more of: local or remote memory space, data storage media, recipient components/devices within the device tracker (122), recipient devices outside of the device tracker (122), etc.

It has been described that spatial positions and spatial directions of a wearable device (e.g., 102-1, 102-2, etc.) in a 3D space (e.g., 126, etc.) can be monitored by a device tracker (e.g., 122, etc.) operating in conjunction with a tracking sensor assembly (e.g., 124, etc.). It should be noted that this is for illustration only. In other embodiments, spatial positions and spatial directions of other types of devices in a 3D space (e.g., 126, etc.) can be monitored by a device tracker (e.g., 122, etc.) operating in conjunction with a tracking sensor assembly (e.g., 124, etc.). For example, spatial positions and spatial directions of objects such as mobile phones, tablet computers, cars, vehicles, ships, airplanes, unmanned aerial vehicles, stationary physical objects, etc., in a 3D space (e.g., 126, etc.) can be monitored by a device tracker (e.g., 122, etc.) operating in conjunction with a tracking sensor assembly (e.g., 124, etc.).

It has been described that both spatial positions and spatial directions of a wearable device (e.g., 102-1, 102-2, etc.) in a 3D space (e.g., 126, etc.) can be monitored by a device tracker (e.g., 122, etc.) operating in conjunction with a tracking sensor assembly (e.g., 124, etc.). It should be noted that this is for illustration only. In other embodiments, only spatial positions, only spatial directions, or only a specific combination or a proper subset of spatial position(s) and spatial direction(s) of a wearable device (e.g., 102-1, 102-2, etc.) in a 3D space (e.g., 126, etc.) are monitored by a device tracker (e.g., 122, etc.) operating in conjunction with a tracking sensor assembly (e.g., 124, etc.). In an example, only spatial positions of a wearable device (e.g., 102-1, 102-2, etc.) are tracked by a device tracker (e.g., 122, etc.) operating in conjunction with a tracking sensor assembly (e.g., 124, etc.). In another example, only spatial directions of a wearable device (e.g., 102-1, 102-2, etc.) are tracked by a device tracker (e.g., 122, etc.) operating in conjunction with a tracking sensor assembly (e.g., 124, etc.).

It has been described that device ID signals can be light-based signals digitally encoded in light rays emitted or reflected off from light sources of a wearable device. It should be noted that this is for illustration only. In other embodiments, device ID signals may be received from a wearable device or a device operating in conjunction with the wearable device in other types of signals transmitted by the wearable device. For example, a wearable device or a device operating in conjunction with the wearable device may send or transmit device ID signals as described herein in the form of any combination of one or more of: light signals, RF signals, Wi-Fi signals, acoustic signals, etc.

It has been described that device ID signals can be sent or transmitted from a wearable device. It should be noted that this is for illustration only. In other embodiments, device ID signals may be received from a device operating in conjunction with a wearable device on behalf of the wearable device. In an example, a device fixed at a seat in which a viewer of a wearable device sits may send or transmit device ID signals as described herein on behalf of the wearable device. In another example, a device (e.g., a mobile device, etc.) carried with a viewer of a wearable device sits may send or transmit device ID signals as described herein on behalf of the wearable device.

A device tracker (e.g., 122, etc.) as described herein can operate in conjunction with a single tracking sensor assembly deployed in a 3D space (e.g., 126, etc.), or multiple tracking sensor assemblies deployed in different spatial locations a 3D space (e.g., 126, etc.), to efficiently monitor spatial positions and spatial directions of a single wearable device or a multitude of wearable devices in the 3D space (126). Additionally, optionally or alternatively, a device tracker (e.g., 122, etc.) as described herein can operate in conjunction with multiple tracking sensor assemblies deployed in multiple 3D spaces (e.g., 126, etc.) to efficiently monitor spatial positions and spatial directions of multiple wearable devices in the multiple 3D spaces (e.g., 126, etc.). Thus, a device tracker (e.g., 122, etc.) as described herein may be scaled to a large capacity to concurrently track or monitor spatial positions and/or spatial directions of numerous devices in a large 3D space.

Device tracking techniques as described herein can operate with a variety of wearable devices that may or may not perform inside out tracking (or self-tracking) of its spatial positions and spatial directions, so long as such wearable device(s) are provisioned with light sources that emit or reflect off light rays (and optionally device ID signals) toward a tracking sensor assembly (e.g., 124, etc.) deployed in a 3D space (e.g., 126, etc.) in which the wearable device(s) reside. A wearable device (e.g., 102-1, 102-2, etc.) may, but is not required to, be freed from actively collecting inside-out-tracking data, analyzing the inside-out-tracking data, determining spatial positions and spatial directions of the wearable device (e.g., 102-1, 102-2, etc.), etc. Thus, under techniques as described herein, wearable devices (e.g., 102-1, 102-2, etc.) may, but is not necessarily limited to only, be made with relatively low costs with relatively simple device/system designs.

Additionally, optionally or alternatively, a device tracker (e.g., 122, etc.) as described herein can, but is not necessarily limited to only, operate with relatively simple networking infrastructure. For example, all spatial positions/directions and device ID information can be acquired from light rays emitted by light sources on wearable devices. Thus, device ID information, spatial positions and spatial directions of wearable devices (e.g., 102-1, 102-2, etc.) can be tracked or monitored by the device tracker (122) regardless of whether there are direct or indirect network links between the device tracker (122) and any of the wearable devices (e.g., 102-1, 102-2, etc.). Thus, device ID information, the spatial positions and spatial directions of wearable devices (e.g., 102-1, 102-2, etc.) can be monitored without incurring network delays, jitters, packet losses, etc., that would likely occur in other approaches that acquire the same information over network links between the device tracker and some or all of the wearable devices (e.g., 102-1, 102-2, etc.). In practice, device tracking operations under techniques as described herein can be performed with relatively high efficiency and with relatively low complexity.

Device tracking techniques as described herein can be implemented with a system in a wide variety of systems, including but not limited to VR systems, AR systems, remote presence systems, game systems, cinema 3D systems, omnidirectional video systems, etc. to monitor spatial positions and spatial directions of a single device or a multitude of devices in one or more 3D spaces (e.g., 126, etc.).

3. Additional Example System Configurations

Figure 1B:
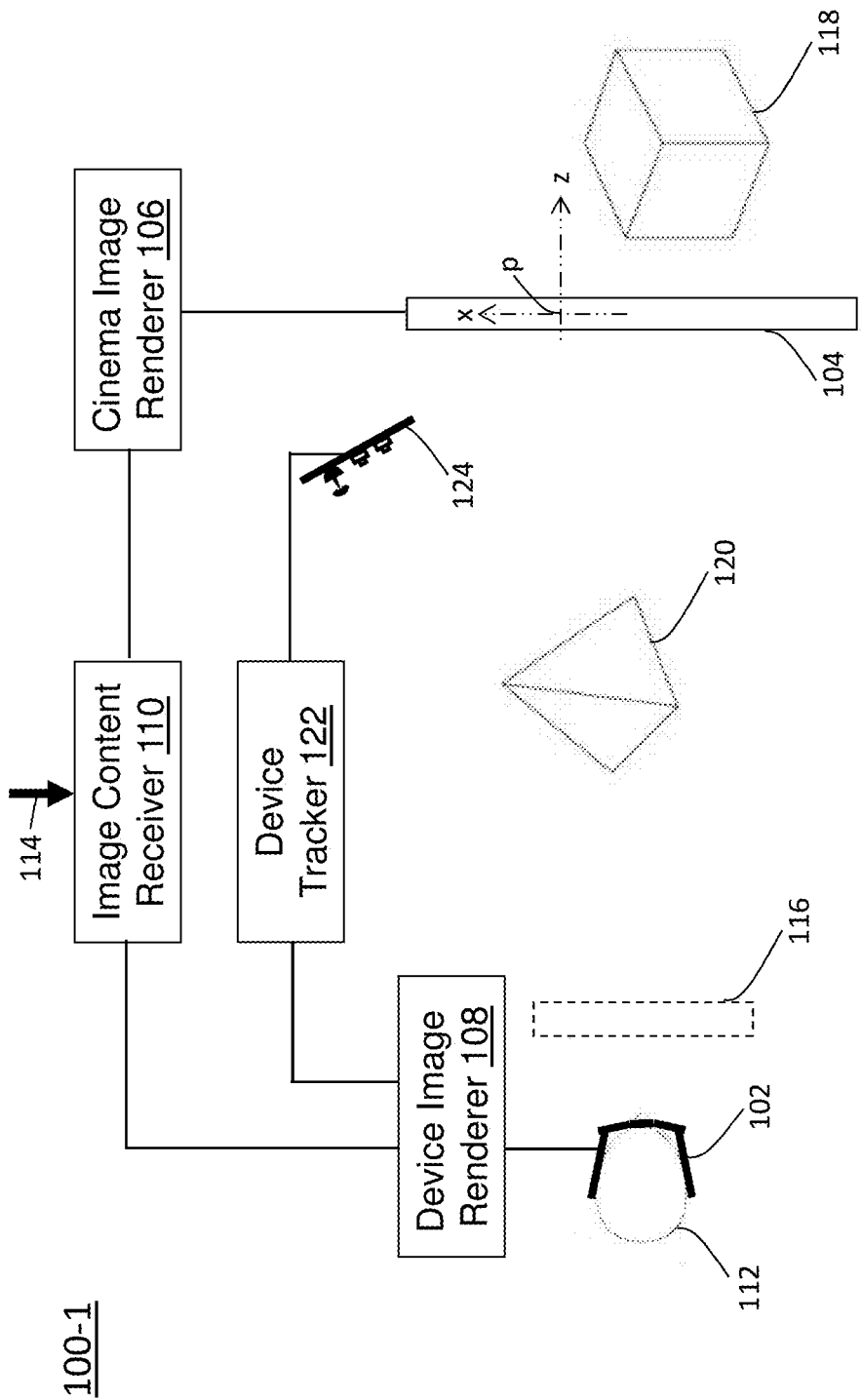

FIG. 1B illustrates an example configuration 100-1 in which spatial positions and/or spatial directions of wearable devices (e.g., 102, etc.) in a 3D space (e.g., 126, etc.) may be tracked or monitored by a device tracker (e.g., 122, etc.). As illustrated, the configuration (100-1) comprises a cinema image renderer 106, a device image renderer 108, an image content receiver 110, the device tracker (122), a tracking sensor assembly (e.g., 124, etc.), a cinema display 104, one or more wearable devices such as a wearable device 102, etc., in a 3D space (126) such as a cinema, home, a movie theater, a hall, a venue, etc. Some or all of the components/devices as depicted in FIG. 1B may be implemented by one or more mechanical components, one or more electrooptical components, one or more computing devices, modules, units, etc., in software, hardware, a combination of software and hardware, etc. Some or all of the components/devices as depicted in FIG. 1B may be communicatively (e.g., wirelessly, with wired connections, etc.) coupled with some other components/devices as depicted in FIG. 1B or with other components/devices not depicted in FIG. 1B.

A wearable device such as the wearable device (102), etc., may be driven by a viewer (e.g., 112, etc.) to make relative motions in relation to the reference Cartesian coordinate system. These relative motions may be represented by any combination of one or more of: linear positions/displacements, angular positions/displacements, linear velocities/speeds, angular velocities/speeds, linear accelerations, rotational accelerations, etc., in relation to the reference Cartesian coordinate system.

The wearable device (102), as a 3D physical object, may have a specific spatial position and a specific spatial direction at any given time point in the 3D space (126). As previously noted, in some embodiments, the specific spatial position of the wearable device (102) at any given time may be characterized or measured by spatial coordinates of a representative spatial position of the wearable device (102) in relation to the reference Cartesian coordinate system. Examples of the representative spatial position may be a point of spatial symmetry, a geometric center point, etc., of an eyeglass frame, a position corresponding to the middle point between the viewer's eyes, etc. Example spatial coordinates of a representative spatial position may be spatial coordinates in the reference Cartesian coordinate system, in a reference polar coordinate system stationary in the 3D space (126), etc.

The specific spatial direction of the wearable device (102) at the given time may be characterized or measured by spatial coordinates of an angular displacement or angular position of a device-stationary three-dimensional coordinate system (e.g., the first device-stationary Cartesian coordinate system of the first wearable device (102-1), the second device-stationary Cartesian coordinate system of the second wearable device (102-2), etc.) of FIG. 1A in relation to the reference Cartesian coordinate system. Example device-stationary three-dimensional coordinate systems may be a three-dimensional Cartesian coordinate system rigidly affixed to or stationary with the wearable device (102) with a positive z-direction corresponding to the viewer's frontal viewing direction, an x-direction parallel to the interpupil distance of the viewer, and a y-direction perpendicular to the x and z directions. Example spatial coordinates of the angular displacement/position of the device-stationary three-dimensional coordinate system in relation to the reference Cartesian coordinate system may be pitch, yaw, roll, etc.

The specific spatial position and the specific spatial direction of the wearable device (102) at any given time may be generally characterized by six spatial dimensions, three of which relate to translations, and the other three of which relate to rotations. In some embodiments, the six spatial dimensions used to characterize of the specific spatial position and the specific spatial direction of the wearable device (102) are fully independent with respect to one another. In these embodiments, the wearable device (102) is said to have six degrees of freedom. Technique as described herein can be used to support viewing omnidirectional images up to 360 degrees (or up to the entire 4π solid angle of a sphere). For example, a wearable device as described herein may view direction-specific device display images from any viewing angle up to 360 degrees (or up to the entire 4π solid angle of a sphere), even though a cinema display on which cinema display images are rendered is fixed or stationary in a 3D space. When viewing away from the cinema display, a viewer of a wearable device may view only the device display images derived from single-layer device images in one or more device image layers.

However, in some operational scenarios, it is possible that linear or angular positions corresponding to a given degree of freedom may still be limited to a range. For example, in a movie theater, spatial positions of the wearable device (102) along an x-direction (e.g., sways, etc.) in the reference Cartesian coordinate system may be limited to a range corresponding to a fraction of a width of an assigned seat to the viewer. Spatial positions of the wearable device (102) along a y-direction (heaves) in the reference Cartesian coordinate system may be limited to a range corresponding to a fraction of the viewer's head. Spatial positions of the wearable device (102) along a z-direction (e.g., surges, etc.) in the reference Cartesian coordinate system may be limited to a range between the back of the viewer's seat and the back of a seat directly in front of the viewer's seat.

Similarly, spatial directions of the wearable device (102) for yaws in reference to the cinema display (104) may be limited to a first range (e.g., +/−20 angular degrees, +/−30 angular degrees, up to +/−180 angular degrees, etc.) of frontal viewing directions. Spatial directions of the wearable device (102) for rolls in reference to the cinema display (104) may be limited to a second range (e.g., +/−20 angular degrees, +/−30 angular degrees, up to +/−180 angular degrees, etc.) of frontal viewing directions. Spatial directions of the wearable device (102) for pitches in reference to the cinema display (104) may be limited to a third range (e.g., +/−20 angular degrees, +/−30 angular degrees, up to +/−180 angular degrees, etc.) of frontal viewing directions. These angular ranges may be constrained differently. For example, the third range for pitches may be set to be relatively small as pitch motions tend to generate relatively serious nauseas and physiological discomforts.

If any of the above-mentioned positional or angular ranges shrinks, or is constrained, to a single value, then a degree of freedom corresponding to the single-value positional or angular range is lost or removed from the six degrees of freedom. The wearable device (102) has zero degree of freedom when the wearable device (102) is (e.g., logically, physically, etc.) fixed in translation and in rotation relative to the cinema display (104). The wearable device (102) has one degree of freedom when the wearable device (102) is fixed in rotation but is confined to move along a line or a one-dimensional curve in translation relative to the cinema display (104). Similarly, the wearable device (102) has one degree of freedom when the wearable device (102) is fixed in translation but is confined to rotate in a single rotational direction (e.g., one of pitch, yaw and roll, etc.) relative to the cinema display (104).

In some embodiments, the device tracker (122) operating in conjunction with the tracking sensor assembly (124) in the 3D space (126) monitors spatial positions and spatial directions of the wearable devices such as the wearable device (102), etc., present in (e.g., an audience area of, etc.) the 3D space (126). In some embodiments, the wearable device (102) has light sources removably or irremovably attached to, or otherwise installed on, the wearable device. These light sources may emit or reflect off light rays such as light rays of visible light wavelengths, light rays of invisible light wavelengths, infrared lights, etc. Examples of light sources may include, but are not necessarily limited to only, any of: light emitters, light emitting diodes (LEDs), non-LED lights, light regenerators, light reflectors, light scattering devices, retroreflectors, etc. By way of example but not limitation, light sources on the wearable device (102) emit or reflect off invisible light such as infrared light, etc., for device tracking purposes.

In some embodiments, one or more tracking image sensors in the tracking sensor assembly (124) generate device tracking images that capture light rays from light sources placed on the wearable devices including but not limited to the wearable device (102). These light rays may be emitted, reflected/redirected/scattered toward, etc., the tracking image sensors in the tracking sensor assembly (124). These light rays may be captured continuously, at a set time schedule, etc. For example, the device tracking images may be taken at a time resolution of a millisecond or a fraction of millisecond, at a time resolution of every hundredth second, at a time resolution of every tenth second, etc.

In some embodiments, the device tracker (122) tracks or determines spatial positions and spatial directions of each of the wearable devices (including but not limited to the wearable device (102)) at a given time point (e.g., over a time interval, over the entire time duration of a 3D movie, etc.) based on one or more device tracking images captured at the given time point by the tracking image sensors (124) from light rays from light sources of the wearable devices.

The input image content (114) may be received in and decoded from one or more of: video signals, video files, video streams, etc. Example image content sources include, but are not necessarily limited to only, one or more of: data repositories, media content servers, media streaming servers, VR systems, AR systems, remote presence systems, video gaming systems, etc.

In some embodiments, the image content receiver (110) receives, from one or more image content sources, input image content 114 for rendering to one or more viewers (e.g., 112, etc.). The input image content (114) may be received in and decoded from one or more of: video signals, video files, video streams, etc. Example image content sources include, but are not necessarily limited to only, one or more of: data repositories, media content servers, media streaming servers, VR systems, AR systems, remote presence systems, video gaming systems, etc.

Example input image content may include, but is not necessarily limited to only, any of: stereoscopic images each of which comprises a left view and a right view, multi-view images each of which comprises two or more views, etc.

By way of example but not limitation, the input image content (114) is carried in a multi-layer multi-view video signal that comprises a cinema image layer and one or more device image layers for rendering one or more multi-view images. The image content receiver (110) decodes the multi-layer multi-view video signal into the cinema image layer and the one or more device image layers.

From the cinema image layer of the multi-layer multi-view video signal, the image content receiver (110) identifies or generates one or more single-layer cinema images. The one or more single-layer cinema images may depict a first proper subset of one or more visual objects (e.g., 118, etc.) in a plurality of visual objects (e.g., 118, 120, etc.). The plurality of visual objects (e.g., 118, 120, etc.) may be depicted by one or more multi-view images from which the single-layer cinema images were derived.

From the one or more device image layers of the multi-layer multi-view video signal, the image content receiver (110) identifies or generates one or more single-layer device images. The one or more single-layer device images may depict one or more proper subsets of one or more visual objects (e.g., 120, etc.) in the plurality of visual objects (e.g., 118, 120, etc.). Both the single-layer cinema images and the single-layer device images were derived from the one or more multi-view images.

In some embodiments, the image content receiver (110) sends or otherwise provides, the one or more single-layer cinema images to the cinema image renderer (106). Furthermore, the image content receiver (110) sends or otherwise provides the one or more single-layer device images to the device image renderer (108).

Based on the one or more single-layer cinema images, the cinema image renderer (106) can render cinema display images, on the cinema display (104), such as one or more 3D cinema images comprising one or more left view cinema images and one or more right view cinema images.

In some embodiments, the device image renderer (108) receives, from the device tracker (122), spatial positions and spatial directions of the wearable device (102) at each time point in a plurality of time points over a time period (e.g., a time interval, the entire time duration of a 3D movie, the entire time duration of an augmented entertainment experience, etc.). Based on the spatial positions and spatial directions of the wearable device (102) at a given time point, the device image renderer (108) can determine spatial relationships between the wearable device (102) and the cinema display (104) at the given time point. In some embodiment, these spatial relationships may be represented by one or more of: linear positions/displacements, angular positions/displacements, linear or angular velocities, linear or angular speeds, linear or angular accelerations, etc., of the wearable device (102) in relation to the cinema display (104) or the reference Cartesian coordinate system in the 3D space (126).

For example, based on the one or more single-layer device images, the device image renderer (108) can select, interpolate, or reconstruct one or more device display images, such as one or more 3D device images comprising one or more left view device images and one or more right view device images that are to be rendered for the given time point. Before rendering the device display images, the device image renderer (108) or the wearable device (102) may perform a spatial transformation some or all of the single-layer device images, the device display images, the left view device images, the right view device images, etc., based on the spatial relationships between the wearable device (102) and the cinema display (104) as determined from the spatial positions and/or spatial directions of the wearable device (102). In some embodiments, device display images may be generated at least in part by performing image interpolation/reconstruction based on image sets that comprises a set of different view images. Example image sets and image reconstructions/interpolations can be found in U.S. Provisional Patent Application No. 62/484,148, with an application title of "ADAPTING VIDEO IMAGES FOR WEARABLE DEVICES" by Ajit Ninan and Neil Mammen, filed on Apr. 11, 2017, the entire contents of which are hereby incorporated by reference as if fully set forth herein.

The device image renderer (108) can then cause the wearable device (102) to render the device display images on a device display 116 of the wearable device (102). The device image renderer (108) can communicate control information, status information, positional data, image data such as the device images, metadata, etc., with wearable image rendering devices (e.g., 102, etc.) over one or more data connections. Example data connections may include, but are not limited, wireless data connections, wired data connections, radio-frequency based data connections, cellular data connections, Wi-Fi data connections, infrared-based data connections, data connections over HDMI cable, data connections over optical cable, data connections over High-Speed Serial Interface (HSSI), High-Definition Serial Digital Interface (HD-SDI), 12G-SDI, USB cable, and the like to seat/armrest/floor, etc.

In some embodiments, the device display (116) is not a physical display but rather an image plane or a virtual display created by light rays emitted by imager(s) in the wearable device (102). The device display (116) of the wearable device (102) may be a movable display in relation to the shared display, such as one associated with an image projector, an AR display, a HoloLens display, a Magic Leap display, a Mixed Reality (MR) display, a tensor display, a volumetric display, a light field (LF) display, an Immy display, a Meta display, a relatively simple pair of AR glasses, a display with any in a wide range of capabilities of overcoming the accommodation-vergence conflict, etc. Example wearable devices and device displays can be found in the previously mentioned U.S. Provisional Patent Application No. 62/484,157, with the application title of "AUGMENTED 3D ENTERTAINMENT SYSTEMS" by Ajit Ninan and Neil Mammen.

In operational scenarios in which single-layer device images comprises device images corresponding to a plurality of different views, the device image renderer (108) may identify or select device display images such as left view device images and right view device images from among the device images corresponding to the plurality of different views. Additionally, optionally or alternatively, some or all of the left view device images and right view device images may be generated by interpolating or combining some or all of the device images corresponding to the plurality of different views.

In some embodiments, the first proper subset of visual objects as depicted in a pair of a left view cinema display image and a right view cinema display image rendered on the cinema display (104) and the one or more second proper subsets of visual objects as depicted in corresponding device display images rendered on the device display (116) are simultaneously (e.g., concurrently, synchronously, within the same image frame interval, etc.) rendered to collectively depict a plurality of visual objects located at different spatial locations in a 3D image space. These spatial locations in the 3D image space may be the same as those specified or described in spatial information of a multi-view unlayered image that was used to partition the plurality of visual objects into the cinema image layer (or the first proper subset of visual objects) and the one or more device image layers (or the one or more second proper subsets of visual objects) in the first place.

In some embodiments, the cinema image renderer (106) and/or the device image renderer (108) perform display management operations as a part of rendering (a) the cinema display images and/or (b) the device display images.

A passive device tracking system as described herein may be used to support real time video applications, near-real-time video applications, non-real-time video applications, virtual reality (VR) applications, augmented reality (AR) applications, remote presence applications, automobile entertainment applications, helmet mounted display applications, heads up display applications, games, 2D display applications, 3D display applications, multi-view display applications, etc. For example, some or all of input image content data (114) can be generated or accessed by the image content receiver (110) in real time, in near real time, in non-real time, etc.

Techniques as described herein can be used to support rendering and viewing 3D or multi-view images with a wide variety of displays. Example displays (e.g., 104, in an eyewear device such as 102, etc.) may include, but are not necessarily limited to only, any of: a cinema display, a home theater display, a television, a projection-based display system, a backlight-based display system, a light field based display system, a light waveguide based display system, liquid crystal based display system, light emitting diode based system, organic light emitting diode based system, etc.

Figure 1C:
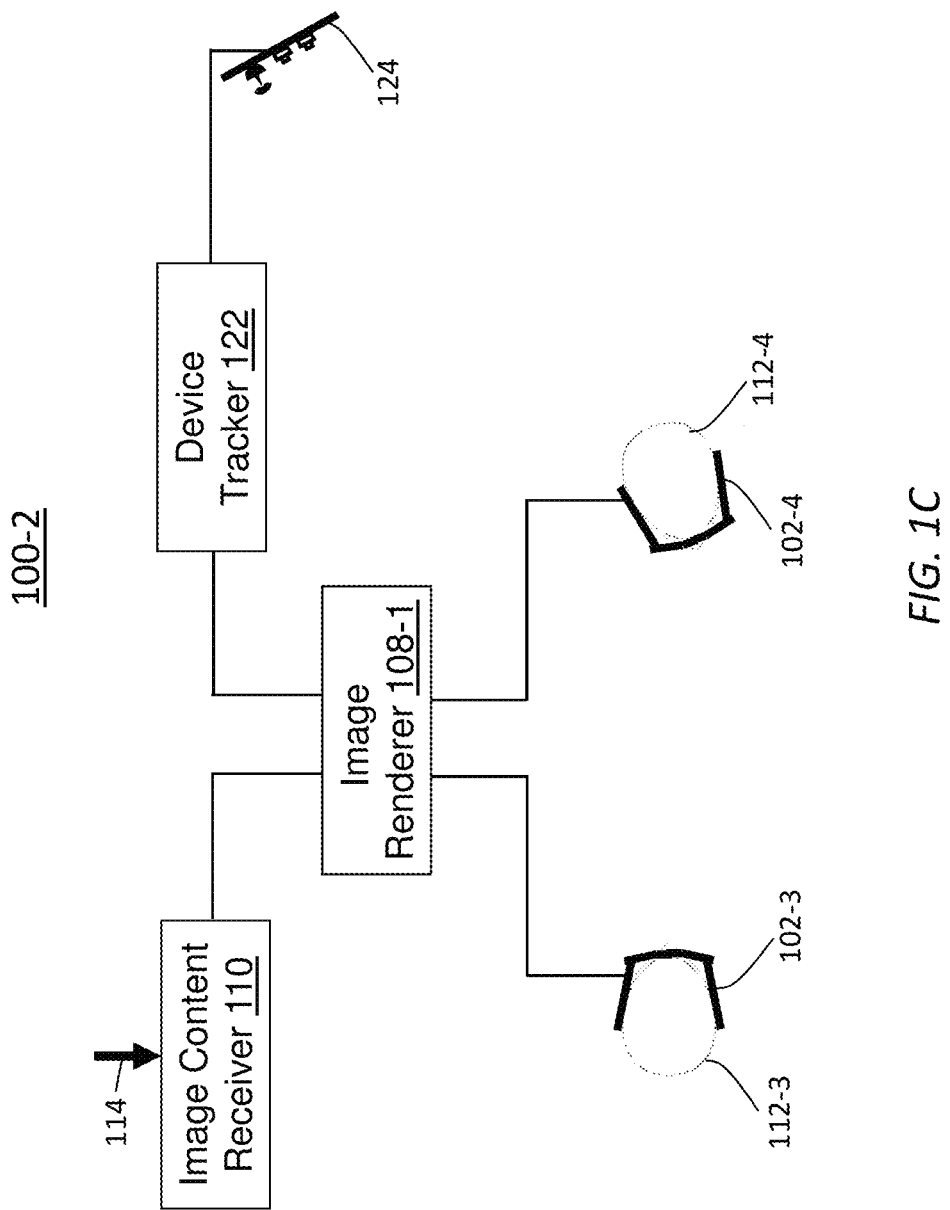

FIG. 1C illustrates an example configuration 100-2 in which spatial positions and/or spatial directions of wearable devices (e.g., 102-3, 102-4, etc.) in a 3D space (e.g., 126, etc.) may be tracked or monitored by a device tracker (e.g., 122, etc.). As illustrated, the configuration (100-2) comprises an image renderer 108-1, an image content receiver 110, one or more wearable devices such as wearable devices (e.g., 102-3, 102-4, etc.), etc., in a 3D space such as a building, a game playing venue, a home, etc. Some or all of the components/devices as depicted in FIG. 1C may be implemented by one or more mechanical components, one or more electrooptical components, one or more computing devices, modules, units, etc., in software, hardware, a combination of software and hardware, etc. Some or all of the components/devices as depicted in FIG. 1C may be communicatively (e.g., wirelessly, with wired connections, etc.) coupled with some other components/devices as depicted in FIG. 1C or with other components/devices not depicted in FIG. 1C.

A wearable device (e.g., 102-3, 102-4, etc.) may be driven, for example by a viewer (e.g., 112-3, 112-4, etc.), to make relative motions in relation to the reference Cartesian coordinate systems in the 3D space (126).

The device tracker (122) operating in conjunction with the tracking sensor assembly (124) deployed in the 3D space can monitor spatial positions and spatial directions of each of the wearable devices (e.g., 102-3, 102-4, etc.) in the 3D space (126). In some embodiments, each of the wearable devices (e.g., 102-3, 102-4, etc.) has respective light sources removably or irremovably attached to, or otherwise installed on, the wearable device (e.g., 102-3, 102-4, etc.).

In some embodiments, one or more tracking image sensors in the tracking sensor assembly (124) generate device tracking images that capture light rays from light sources placed on the wearable devices (e.g., 102-3, 102-4, etc.). These light rays may be emitted, reflected, redirected, and/or scattered toward the tracking image sensors in the tracking sensor assembly (124), and may be captured continuously, at a set time schedule, even on demand, etc. For example, the device tracking images may be taken at a time resolution of a millisecond or a fraction of millisecond, at a time resolution of every hundredth second, at a time resolution of every tenth second, etc.

In some embodiments, the device tracker (122) tracks or determines spatial positions and spatial directions of each of the wearable devices at a given time point (e.g., over a time interval, over the entire time duration of a 3D movie, etc.) based on one or more device tracking images captured at the given time point by the tracking image sensors (124) from light rays from light sources of the wearable devices.

In some embodiments, the image content receiver (110) receives, from one or more image content sources, input image content 114 for rendering to one or more viewers (e.g., 112-3, 112-4, etc.). The input image content (114) may be received in and decoded from one or more of: video signals, video files, video streams, etc. Example image content sources include, but are not necessarily limited to only, one or more of: data repositories, media content servers, media streaming servers, VR systems, AR systems, remote presence systems, video gaming systems, etc.

In some embodiments, the image content receiver (110) sends or otherwise provides, the input image content (114) to the image renderer (108-1). In some embodiments, the image rendering device (108-1) receive, from the device tracker (122), spatial positions and spatial directions of each of the wearable devices (e.g., 102-3, 102-4, etc.) at each time point in a plurality of time points over time (e.g., over a time interval, over the entire time duration of a 3D movie, etc.). Based on the spatial positions and spatial directions of each of the wearable devices (e.g., 102-3, 102-4, etc.) at any given time, the image rendering device (108-1) can determine spatial relationships between each such wearable device (e.g., 102-3, 102-4, etc.) and a reference Cartesian coordinate system in the 3D space (126) or between/among the wearable devices (e.g., 102-3, 102-4, etc.) at the given time. In some embodiment, these spatial relationships may be represented by one or more of: linear positions/displacements, angular positions/displacements, linear or angular velocities, linear or angular speeds, linear or angular accelerations, etc., of the wearable device (102) in relation to the reference Cartesian coordinate system in the 3D space (126) or in relation to a device-stationary Cartesian coordinate system fixed to or stationary with any given wearable device (e.g., 102-3, 102-4, etc.).

For example, based on the input image content (114), the image renderer (108-1) can determine one or more third device images such as 3D images comprising left view images and right view images. Before rendering the third device images, the image renderer (108-1) or the third wearable device (102-3) may perform spatial transformation on the third device images (or the left/right view images thereof) to generate third device display images based on spatial relationships between the third wearable device (102-3) and the reference Cartesian coordinate system in the 3D space (126) or based on spatial relationships between/among the wearable devices (e.g., 102-3, 102-4, etc.).

The image renderer (108-1) can cause the third wearable device (102-3) to render the third device display images as generated with the spatial transformation on a third device display associated with the third wearable device (102-3). The third device display may be a physical display or a virtual display created by light rays emitted by imager(s) in the third wearable device (102-3).

Similarly, based on the input image content (114), the image renderer (108-1) can determine one or more fourth device images such as 3D images comprising left view images and right view images. Before rendering the fourth device images, the image renderer (108-1) or the fourth wearable device (102-4) may perform spatial transformation on the fourth device images (or the left/right view images thereof) to generate fourth device display images based on spatial relationships between the fourth wearable device (102-4) and the reference Cartesian coordinate system in the 3D space (126) or based on spatial relationships between/among the wearable devices (e.g., 102-3, 102-4, etc.).

The image renderer (108-1) can cause the fourth wearable device (102-4) to render the fourth device display images as generated with the spatial transformation on a fourth device display associated with the fourth wearable device (102-4). The fourth device display may be a physical display or a virtual display created by light rays emitted by imager(s) in the fourth wearable device (102-4).

The device image renderer (108) can communicate control information, status information, positional data, image data such as the device images, metadata, etc., with wearable image rendering devices (e.g., 102-1, 102-2, 102-3, 102-4, etc.) over one or more data connections. Example data connections may include, but are not limited, wireless data connections, wired data connections, radio-frequency based data connections, cellular data connections, Wi-Fi data connections, infrared-based data connections, data connections over HDMI cable, data connections over optical cable, data connections over High-Speed Serial Interface (HSSI), High-Definition Serial Digital Interface (HD-SDI), 12G-SDI, USB cable, and the like to seat/armrest/floor, etc.

4. Example Wearable Devices

Figure 2A:
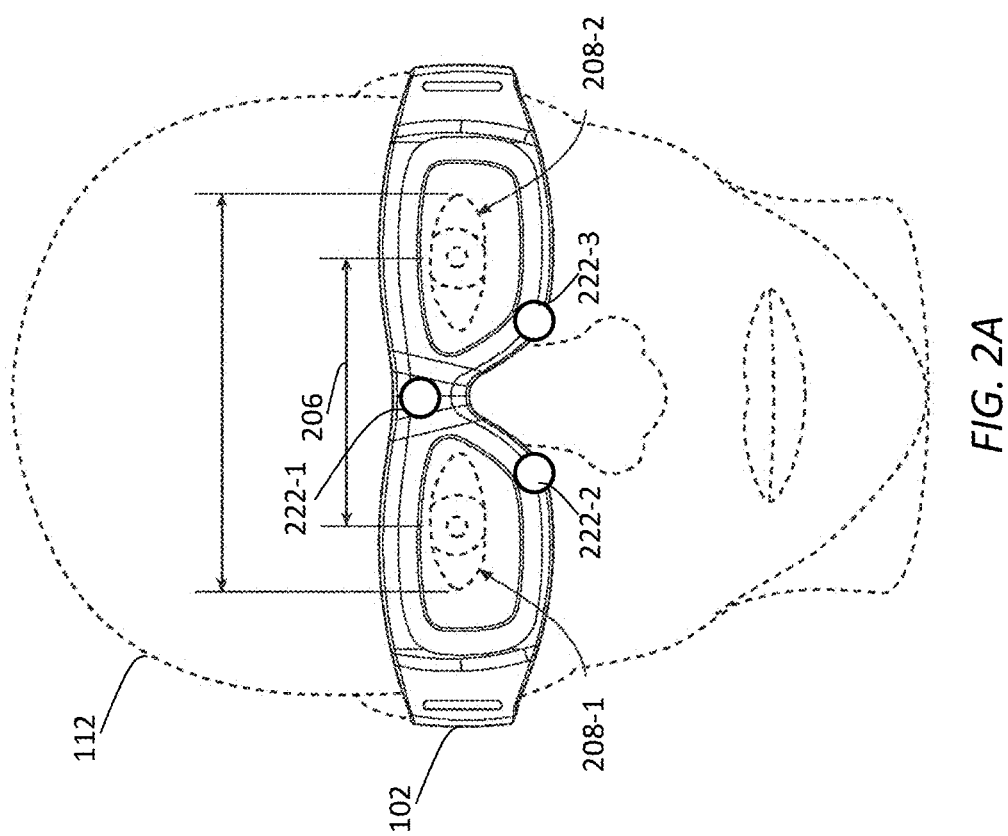
FIG. 2A and FIG. 2B illustrate example wearable devices with light sources.

FIG. 2A illustrates an example wearable device (e.g., 102, etc.) with one or more light sources 222-1, 222-2, 222-3, etc. Some or all of the components/devices depicted in FIG. 2A may be implemented by one or more mechanical components, electrooptical components, one or more computing devices, modules, units, etc., in software, hardware, a combination of software and hardware, etc. Some or all of the components/devices as depicted in FIG. 2A may be communicatively (e.g., wirelessly, with wired connections, etc.) coupled with some other components/devices as depicted in FIG. 2A or with other components/devices not depicted in FIG. 2A.

In some embodiments, the wearable device (102) may be a wearable device that can be worn or mounted on the head of the viewer (112). The wearable device (102) may include an eyeglasses frame, a face shield, a helmet, a strap attachment, etc. By way of example but not limitation, the light sources (222-1 through 222-3) may be either removably or irremovably attached with one or more (e.g., mechanically, etc.) rigid parts (e.g., bridge, top bar, rim, etc.) of an eyeglass frame in the wearable device (102). When the viewer (112) is wearing the wearable device (102), spatial positions of the light sources are stationary relative to the wearable device (102) but may not be stationary relative to a 3D space in which the viewer (112) or the wearable device (102) is located because of the viewer's body or head movements. The eyeglass frame may be personalized to an individual viewer or may be a generic device of a fixed size to be worn or mounted by a relatively large population of viewers (e.g., full size, children size, etc.).

In some embodiments, a light source as described herein may have an attachment mechanism such as an insert tab, a keyed mechanical part, etc. that fits into a receptacle on the wearable device. In some embodiments, the attachment mechanism can securely fit into the receptacle, and cannot be easily or casually removed by a viewer (e.g., 112, etc.). In some embodiments, a light source as described herein may be permanently affixed to the wearable device.

In various embodiments, none, some or all of the light sources (222-1 through 222-3) may be light emitters (e.g., an LED light, an infrared light emitter, etc.) that emit light rays to be captured into device tracking images by a device tracker (e.g., 122 of FIG. 1A through FIG. 1C, etc.) operating in conjunction with one or more tracking sensor assemblies (e.g., 124, etc.) deployed in a 3D space (e.g., 126, etc.).

In various embodiments, none, some or all of the light sources (222-1 through 222-3) may be light reflectors that emit light rays to be captured into device tracking images by a device tracker (e.g., 122 of FIG. 1A through FIG. 1C, etc.) operating in conjunction with one or more tracking sensor assemblies (e.g., 124, etc.) deployed in a 3D space (e.g., 126, etc.).

In some embodiments, all of the light sources (222-1 through 222-3) on the wearable device (102) are light reflectors. Tracking image sensors in a tracking sensor assembly (e.g., 124, etc.) may comprise a laser scanner that emits a scanning laser beam (e.g., with light wavelengths invisible to human visual perception, etc.) to scan light sources of wearable devices (e.g., 102, 102-1 through 102-4, etc.) present in a 3D space. The light sources (222-1 through 222-3) on the wearable device (102) may be retroreflectors (e.g., reflect incoming light rays back to the sender or a specific direction, etc.), scattering reflectors, etc., that receive incoming laser light rays of the scanning laser beam from the laser scanner and redirect/reflect these incoming light rays into reflected light rays toward one or more tracking sensor assemblies (e.g., 124, etc.). In some embodiments, the light reflectors (222-1 through 222-3) may comprise light conversion materials such as quantum dots, etc., that converts received laser light rays into regenerated light rays. The reflected or regenerated light rays from the light source (222-1 through 222-3) may focus or (optionally or alternatively) scatter onto the laser scanner, one or more light sensors operating in conjunction with the laser scanner, one or more image capturing devices operating in conjunction with the laser scanner, etc. The reflected or regenerated light rays from the light sources (222-1 through 222-3) may be captured into device tracking images as described herein.

Additionally, optionally or alternatively, one or more radio-frequency (RF) tracking ID signals, one or more light tracking ID signals, etc., may be sent by a separate device (operating in conjunction with the wearable device (102) installed at the seating space of the viewer of the wearable device (102) and captured by one or more device ID sensors in the one or more tracking sensor assemblies (e.g., 124, etc.) for the purpose of determining device ID information related to the wearable device (102); the separate device may be stationary, removably or irremovably attached to the seat, etc.

In some embodiments, one of the light sources (222-1 through 222-3) on the wearable device (102) is selected or used as a light emitter while all the remaining light sources are light reflectors. By way of illustration but not limitation, the light source (222-1) may be selected as a light emitter, which may comprise one or more of: LED lights, laser light emitters, light emitters with light conversion materials, etc. The remaining light sources (222-2 and 222-3) may be light reflectors, each of which may comprise one or more of: retroreflectors, scattering reflectors, etc. The light reflector (222-1) emits light rays that focus or (optionally or alternatively) scatter onto one or more tracking image sensors in one or more tracking sensor assemblies (e.g., 124, etc.). In the meantime, the light reflectors (222-2 and 222-3) receive incoming light rays from the light source (222-1) and redirect/reflect these incoming light rays into reflected light rays. In some embodiments, the light reflectors (222-2 and 222-3) may comprise light conversion materials such as quantum dots, etc., that converts received laser light rays into regenerated light rays. The reflected/regenerated light rays from the light source (222-2 and 222-3) may focus or (alternatively, optionally or alternatively) scatter onto the one or more tracking image sensors in the one or more tracking sensor assemblies (e.g., 124, etc.). The emitted light rays, reflected/regenerated light rays may be captured into device tracking images as described herein.

Additionally, optionally or alternatively, light rays from a light emitter as described herein may be digitally encoded with device ID information for the wearable device (102); at least a portion of digitally encoded light rays from the light emitter or light reflectors may be captured by one or more device ID sensors in the one or more tracking sensor assemblies (e.g., 124, etc.).

In some embodiments, light rays emitted by a light emitter in the light sources (222-1 through 222-3) may be divided into a plurality of light ray portions. A first light ray portion in the plurality of light ray portions in the light emitter in the light sources (222-1 through 222-3) comprises light rays from the light emitter that form one or more solid angles originated from the designated spatial position(s) of the light emitter on the wearable device (102). The solid angles formed by the light rays of the light emitters may be direction specific, semispherical, or omnidirectional to ensure at least one, two or more device tracking images concurrently captured at any given time point by device image sensors in the device sensor assemblies (e.g., 124, etc.) in the 3D space (126) to contain image content portions depicting the light emitter, regardless of which angular position (e.g., viewing direction, etc.) in one or more supported angular positional ranges the viewer directs the wearable device (102) to (e.g., in normal viewing operations, in front viewing operations, in omnidirectional viewing operations, etc.) and/or regardless of which spatial position (e.g., an assigned seat, a chosen sweet spot, a specific space in a room, etc.) in one or more supported spatial positional ranges the viewer causes the wearable device (102) to move to (e.g., in normal viewing operations, in front viewing operations, in omnidirectional viewing operations, etc.).

In some embodiments, additional light ray portions in the plurality of light ray portions in the light emitter in the light sources (222-1 through 222-3) can be directed or redirected (e.g., via a line of sight, via a light waveguide, via an optical stack comprising light ray redirection elements, etc.) to illuminate light reflectors in the light sources (222-1 through 222-3) to cause the light reflectors to reflect off light rays that form reflected light ray portions originated from the light reflectors respectively toward one or more tracking sensor assemblies (e.g., 124, etc.) in the 3D space (126).

In some embodiments, each of the light reflectors in the light sources (222-1 through 222-3) reflects off a respective second light ray portion. Light rays reflected off from each such light reflector may form one or more solid angles originated from the designated spatial position(s) of the light reflector on the wearable device (102). The solid angles formed by the light rays of the light reflectors may be direction specific, semispherical, or omnidirectional to ensure the previously mentioned device tracking images to contain image content portions depicting the light reflector, regardless of which angular position (e.g., viewing direction, etc.) in one or more supported angular positional ranges the viewer directs the wearable device (102) to (e.g., in normal viewing operations, in front viewing operations, in omnidirectional viewing operations, etc.) and/or regardless of which spatial position (e.g., an assigned seat, a chosen sweet spot, a specific space in a room, etc.) in one or more supported spatial positional ranges the viewer causes the wearable device (102) to move to (e.g., in normal viewing operations, in front viewing operations, in omnidirectional viewing operations, etc.).

In some embodiments, a light emitter in the light sources (222-1 through 222-3) of the wearable device (102) may be electrically or optoelectrically coupled to a light emission controller that can control the light emitter to emit light rays that logically represent one or more device ID signals encoded with device ID information and optionally other information related to the wearable device (102).

Figure 2B:
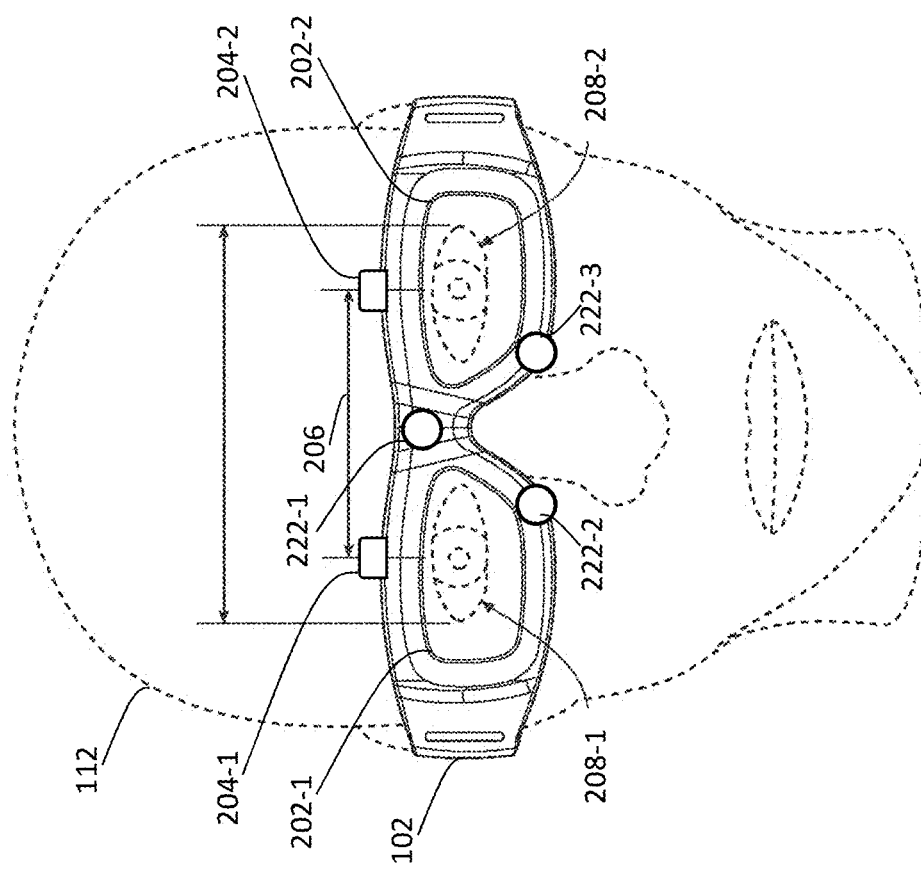

FIG. 2B illustrates an example wearable device (e.g., 102, etc.) with one or more light sources 222-1, 222-2, 222-3, a left view optical stack 202-2, a right view optical stack 202-1, a left view imager 204-2, a right view imager 204-1, etc. Some or all of the components/devices depicted in FIG. 2B may be implemented by one or more mechanical components, electrooptical components, one or more computing devices, modules, units, etc., in software, hardware, a combination of software and hardware, etc. Some or all of the components/devices as depicted in FIG. 2B may be communicatively (e.g., wirelessly, with wired connections, etc.) coupled with some other components/devices as depicted in FIG. 2B or with other components/devices not depicted in FIG. 2B.

The wearable device (102) may be a wearable device that can be worn or mounted on the head of the viewer (112). Additionally, optionally or alternatively, the wearable device (102) may include an eyeglasses frame, a face shield, a helmet, a strap attachment, etc. By way of example but not limitation, the light sources (222-1 through 222-3) may be either removably or irremovably attached with one or more (e.g., mechanically, etc.) rigid parts of the wearable device (102). When the viewer (112) is wearing the wearable device (102), spatial positions of the light sources are stationary relative to the wearable device (102) but may not be stationary relative to a 3D space (e.g., 126, etc.) in which the viewer (112) or the wearable device (102) is located because of the viewer's body or head movements.

The frame can be used to (e.g., removably, irremovably, etc.) fit the left view optical stack (202-2) and the right view optical stack (202-1) in front of the left eye (208-2) and the right eye (208-1), respectively. The eyeglass frame is further used to (e.g., removably, irremovably, etc.) mount the left view imager (204-2) and the right view imager (202-1), for example, on a top edge (or rim) of the eyeglass frame.

The left view optical stack (202-2) is for a viewer or viewer (e.g., 112, etc.) of the wearable device (102) to view left view cinema display images rendered on a cinema display (104 of FIG. 1, etc.) such as a screen display in a cinema, a display in a home entertainment system, etc. The right view optical stack (202-1) is for the viewer (112) of the wearable device (102) to view right view cinema display images rendered on the cinema display (104). The left view cinema display images as viewed by the viewer (112) through the left view optical stack (202-2) and the right view cinema display images as viewed by the viewer (112) through the right view optical stack (202-1) form stereoscopic cinema display images.

The left view imager (204-2) is for the viewer (112) to view left view device display images rendered on the device display (116). The right view imager (204-1) is for the viewer (112) to view right view device display images rendered on the device display (116). The left view device display images as viewed by the viewer (112) through the left view imager (204-2) and the right view device display images as viewed by the viewer (112) through the right view imager (204-1) form stereoscopic device display images complementary to the stereoscopic cinema display images.

In some embodiments, the device display (116) is not a physical display, but rather an image plane or a virtual display created by light rays emitted by the left view imager (204-2) and the right view imager (204-1). More specifically, the left view imager (204-2) emits left view light rays that reach the left eye (208-2) of the viewer (112) through light reflections (e.g., by way of the left view optical stack (202-2), etc.) to allow the viewer (112) to visually perceive or view the left view device display images as if the left view device display images are displayed at the device display (116). Likewise, the right view imager (204-1) emits right view light rays that reach the right eye (208-1) of the viewer (112) through light reflections (e.g., by way of the right view optical stack (202-1), etc.) to allow the viewer (112) to visually perceive or view the right view device display images as if the right view device display images are displayed at the device display (116).

In some embodiments, the device display (116) may be located at a spatial depth different from or the same as (e.g., in front of the cinema display (104), behind the firs display (104), coincide with the cinema display etc.) that of the cinema display (104) in reference to the viewer. As used herein, the term "depth" or "spatial depth" may refer to a spatial distance in front a viewer between the viewer and a spatial surface representing an image rendering surface (e.g., plane, freeform curved surface, etc.) of a display, whether the display is physical or virtual.

In some embodiments, the device display (116) is located at a single fixed depth or multiple fixed depths (e.g., concurrently, time sequentially via time-division multiplexing, etc.) to the viewer (112). In a non-limiting example, the left view imager (204-2) and the right view imager (204-1) may operate with lens elements (e.g., with fixed focal lengths, etc.) included in the left view optical stack (202-2) and the right view optical stack (202-1) to project the left view device display images and the right view device display images from an image plan (or the device display (116)) at a fixed depth to the viewer (112). In another non-limiting example, the left view imager (204-2) and the right view imager (204-1) may operate with lens elements (e.g., with fixed focal lengths, with variable focal lengths, etc.) included in the left view optical stack (202-2) and the right view optical stack (202-1) to project the left view device display images and the right view device display images from an image plan (or the device display (116)) at multiple fixed depths to the viewer (112) concurrently, time sequentially, etc.

In some embodiments, the device image renderer (108), or the left view imager (204-2) and the right view imager (204-1), can generate a set of time-multiplexed or time-synchronous 3D device display images from a single 3D device image and depth information (e.g., a depth image, etc.) specifying depths of visual objects depicted in the single 3D device image. The set of time-multiplexed or time-synchronous 3D device display images may be consecutively or concurrently displayed, by the device image renderer (108), or by the left view imager (204-2) and the right view imager (204-1), at a device display at different spatial depths (or multiple device displays) at different time sub-intervals within an overall image frame interval (or time duration) allocated to displaying the single 3D device image.

Additionally, optionally or alternatively, the left view imager (204-2) and the right view imager (204-1) may operate with lens elements (e.g., with variable focal lengths, with tunable focal lengths, etc.) included in the left view optical stack (202-2) and the right view optical stack (202-1) to project the left view device display images and the right view device display images from an image plan (or the device display (116)) at a variable depth to the viewer (112). Examples of displaying images on image planes at variable depths can be found in U.S. Provisional Patent Application Ser. No. 62/414,901, filed on Oct. 31, 2016, the contents of which are incorporated herein by reference in its entirety.

The left view optical stack (202-2) represents an electrooptical stack that allows left view light rays from the cinema display (104)—used to rendered the left view cinema display images on the cinema display (104)—to reach (or to be transmitted to) the left eye (208-2) of the viewer (112). The right view optical stack (202-1) represents an electrooptical stack that allows right view light rays from the cinema display (104)—used to rendered the right view cinema display images on the cinema display (104)—to reach (or to be transmitted to) the right eye (208-1) of the viewer (112). Thus, at runtime, the left view optical stack (202-2) may be optically transparent to the left view light rays from the cinema display (104) when the left view cinema display images are being rendered on the cinema display (104); and the right view optical stack (202-1) may be optically transparent to the right view light rays when the right view cinema display images are being rendered on the cinema display (104).

An electrooptical stack as described herein may comprise one or more mechanical, optical and/or electrooptical component layers including but not limited to a combination of one or more of: light transmissive component layers, light reflective component layers, light filtering layers, light modulation layers, micro-prism layers, micro-lens layers, variable or fixed lenses, beam splitters, beam combiners, light engines, switching elements (e.g., transistor-based, etc.) to control levels of light transmittance (or transmissivity) or light reflectance (reflectivity), of some or all of one or more lens portions (e.g., of the left view lens (202-2), of the right view lens (202-1), of some or all of one or more light wavelengths or wavelength ranges, etc.

Techniques as described herein can be used to implement a wearable device (e.g., 102, etc.) to support rendering and viewing 3D images with a wide variety of left/right eye separation technologies including but not limited to those based on anaglyph, linear polarization, circular polarization, shutter glasses, spectral spatial separation, etc. Any of these left/right eye separation technologies may be used in the wearable device (102) to allow light rays used for rendering the left view cinema display images and the right view cinema display images to respectively reach or present to the left eye (208-2) and the right eye (208-1)—which have respective sweet spots (or clear vision areas) with centers spatially separated by an interpupil distance 206—of the viewer (112).

For example, in some embodiments, the left view optical stack (202-2) and the right view optical stack (202-1) may implement anaglyph 3D techniques for viewing the left view cinema display images and the right view cinema display images rendered on the cinema display (104). The left view optical stack (202-2) and the right view optical stack (202-1) provide left/right eye separation by filtering the light (e.g., red light for rendering one image rendered and cyan light for rendering the other image, etc.) through two color filters such as a red filter and a cyan filter.

In some embodiments, the left view optical stack (202-2) and the right view optical stack (202-1) may implement linear polarization 3D techniques for viewing the left view cinema display images and the right view cinema display images rendered on the cinema display (104). The left view optical stack (202-2) and the right view optical stack (202-1) provide left/right eye separation by filtering linearly polarized light (vertically polarized light for rendering one image and horizontally polarized light for rendering the other image) through two orthogonal linear polarizers such as a vertical polarizer and a horizontal polarizer.

In some embodiments, the left view optical stack (202-2) and the right view optical stack (202-1) may implement circular polarization 3D techniques for viewing the left view cinema display images and the right view cinema display images rendered on the cinema display (104). The left view optical stack (202-2) and the right view optical stack (202-1) provide left/right eye separation by filtering circularly polarized light (left-handedly polarized light for rendering one image and right-handedly polarized light for rendering the other image) through two orthogonal circular polarizers such as a left-handed polarizer and a right-handed polarizer.

In some embodiments, the left view optical stack (202-2) and the right view optical stack (202-1) may implement shutter glasses 3D techniques for viewing the left view cinema display images and the right view cinema display images rendered on the cinema display (104). The left view optical stack (202-2) and the right view optical stack (202-1) provide left/right eye separation by left/right eye shuttering (a first image displaying time interval for rendering one image and a second image displaying time interval for rendering the other image) through synchronizing time-multiplexed viewing of left and right eyes with time-multiplexed rendering of respective left and right images.

In some embodiments, the left view optical stack (202-2) and the right view optical stack (202-1) may implement spectral spatial separation 3D techniques for viewing the left view cinema display images and the right view cinema display images rendered on the cinema display (104). The left view optical stack (202-2) and the right view optical stack (202-1) provide left/right eye separation by filtering the light (e.g., a first set of red, green and blue light for rendering one image rendered and a second set of red, green and blue light for rendering the other image where the first set of red, green and blue light is spectrally separated from the second set of red, green and blue light, etc.) through two spectral light filters (e.g., a first filter that passes the first set of red, green and blue light but rejects the second set of red, green and blue light and a second filter that passes the second set of red, green and blue light but rejects the first set of red, green and blue light, etc.).

In various embodiments, the wearable device (102) may use same or different left/right eye separation technologies for rendering the left view device display images and the right view device display images, as compared with those for rendering the left view cinema display images and the right view cinema display images. In a non-limiting example implementation, the wearable device (102) may comprise spatially separated left and right view imagers (e.g., 204-2 and 204-1, etc.)—for example located apart with approximately the interpupil distance (206)—to project the left view device display images and the right view device display images to the left eye (208-2) and the right eye (208-1), respectively.

5. Example 3D Spaces

Figure 2C:
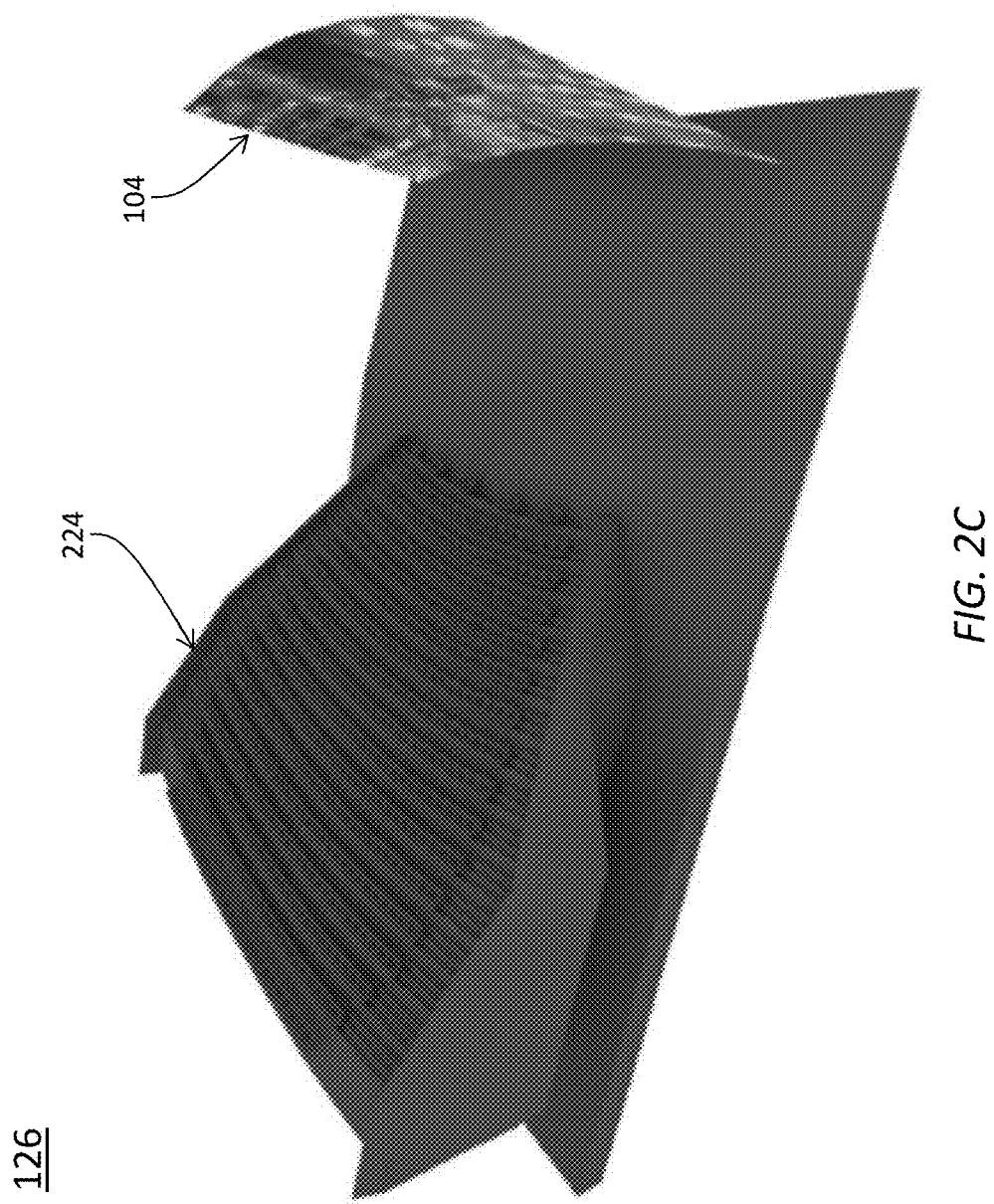
FIG. 2C through FIG. 2E illustrate example three-dimensional space(s) in which device tracking may be used to monitor spatial positions and spatial directions of a single wearable device or multiple wearable devices.

FIG. 2C illustrates a perspective view of an example 3D space (e.g., 126, etc.) in which device tracking under techniques as described herein may be used to monitor spatial positions and spatial directions of a single wearable device or a plurality of wearable devices (e.g., 102, 102-1 through 102-4, etc.). As shown, the 3D space (126) may comprise an audience area 224 comprising a plurality of seating spaces. A viewer wearing a wearable device (e.g., one of 102 and 102-1 through 102-4, etc.) may be seated in a specific seating space in the plurality of seating spaces in the 3D space (126) to view image content that may be presented at a cinema display (e.g., 104, etc.) alone, at one or more displays of the wearable device (e.g., one of 102 and 102-1 through 102-4, etc.) alone, at the cinema display (104) in combination with one or more displays of the wearable device (e.g., one of 102 and 102-1 through 102-4, etc.), etc.

Figure 2D:
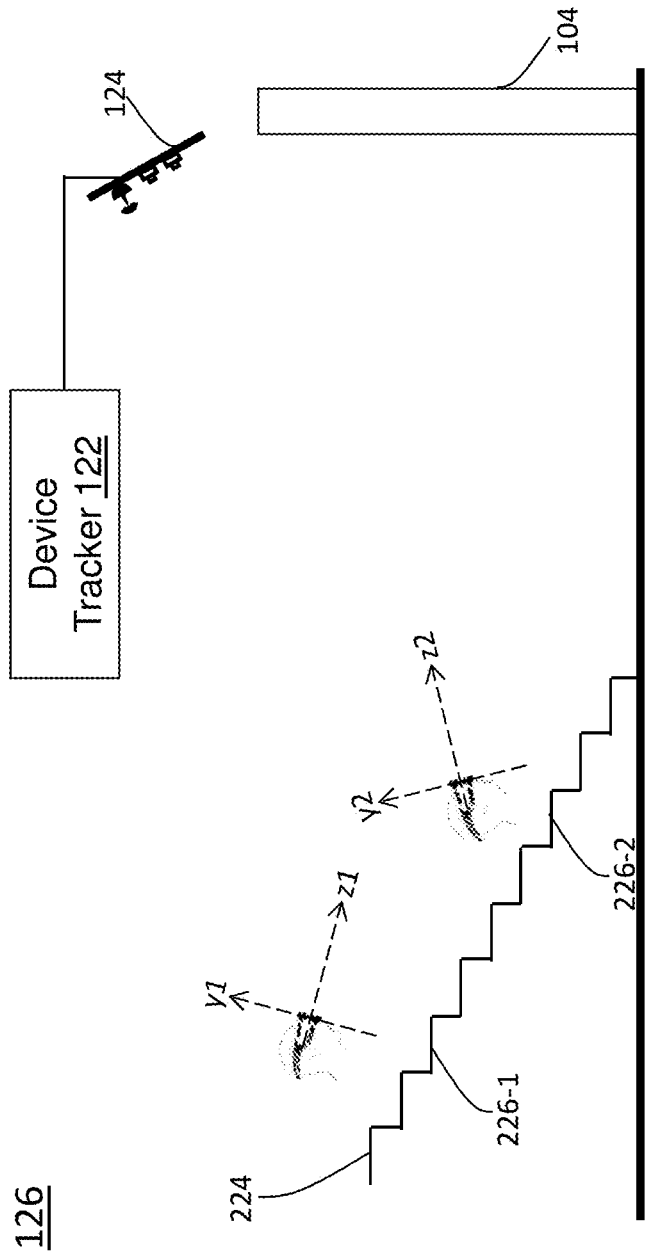
Figure 2E:
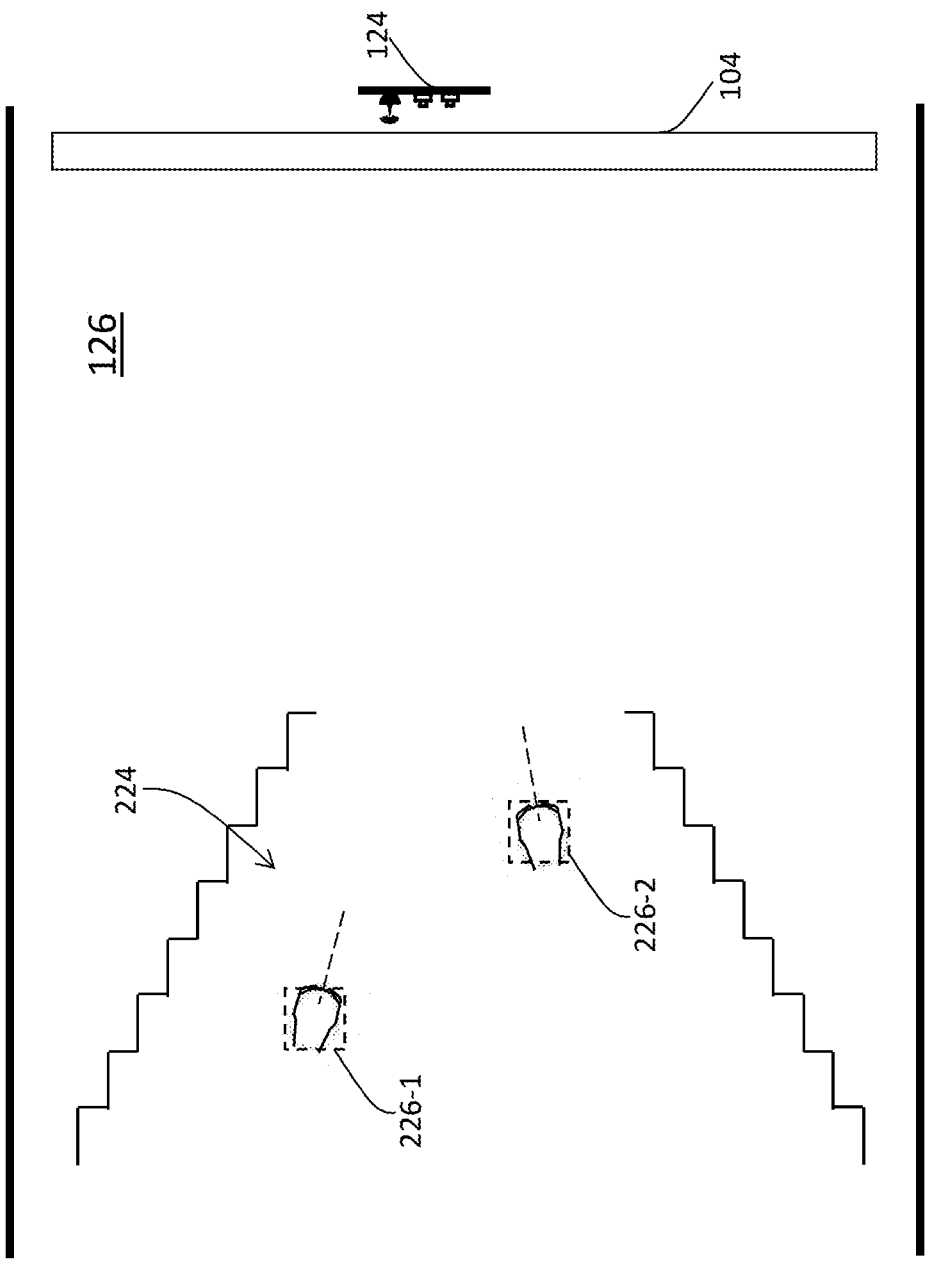

FIG. 2D and FIG. 2E illustrate cross-sectional side and top views of an example 3D space (e.g., 126, etc.) in which device tracking under techniques as described herein may be used to monitor spatial positions and spatial directions of a plurality of wearable devices (e.g., 102-1, 102-2, etc.). As shown, the 3D space (126) may comprise an audience area (e.g., 224, etc.) comprising a plurality of seating spaces (e.g., 226-1, 226-2, etc.).

A first viewer wearing a first wearable device (e.g., 102-1, etc.) may be seated in a first seating space 226-1 in the plurality of seating spaces in the 3D space (126) to view cinema image content that may be presented at a cinema display (e.g., 104, etc.) alone, at a device display of the first wearable device (102-1) alone, at the cinema display (104) in combination with the device display of the first wearable device (102-1), etc. Similarly, a second viewer wearing a second wearable device (e.g., 102-2, etc.) may be seated in a second seating space 226-2 in the plurality of seating spaces in the 3D space (126) to view the same cinema image content that may be presented at the cinema display (104) alone, at a device display of the second wearable device (102-2) alone, at the cinema display (104) in combination with the device display of the second wearable device (102-2), etc.

In some embodiments, one or more tracking sensor assemblies (e.g., one of which may be 124, etc.) may be deployed at one or more designated spatial locations in the 3D space (126). These tracking sensor assemblies (e.g., 124, etc.) may be removably or irremovably attached to or installed on one or more rigid parts (e.g., ceiling, walls, surrounding areas of a cinema display, a structure suspended from a ceiling, a structure affixed to a rigid part, a track, a hinge, etc.) of the 3D space (126). In some embodiments, a device tracker (e.g., 122) operates with the one or more tracking sensor assemblies (e.g., 124, etc.) to monitor or track spatial positions and spatial directions of each of the first wearable device (102-1) and the second wearable device (102-2). Spatial coordinate values indicating spatial positions and/or spatial directions of the first wearable device (102-1) and the second wearable device (102-2) may be monitored or tracked by the device tracker (122) at any time point in a plurality of time points distributed over some or all of a time duration, a movie session, a cinema 3D session, an augmented entertainment experience, etc.

The spatial coordinate values of the first wearable device (102-1) and the second wearable device (102-2) that are monitored/tracked by the device tracker (122) may include, but are not necessarily limited to only, any of: linear displacements or linear positions of the first wearable device (102-1) in relation to a reference Cartesian coordinate system stationary in the 3D space (126); angular displacements or angular positions of the first wearable device (102-1) as represented by a first device-stationary coordinate system (e.g., comprising y1 and z1 axes, etc.) stationary to the first wearable device (102-1) in relation to the reference Cartesian coordinate system; linear displacements or linear positions of the second wearable device (102-2) in relation to the reference Cartesian coordinate system; angular displacements or angular positions of the second wearable device (102-2) as represented by a second device-stationary coordinate system (e.g., comprising y2 and z2 axes, etc.) stationary to the second wearable device (102-2) in relation to the reference Cartesian coordinate system; etc.

In some embodiments, a tracking device (e.g., 122, etc.) or a tracking sensor assembly (e.g., 124, etc.) operating in conjunction with the tracking device (122) performs individual and/or collective calibration operations on some or all of one or more tracking image sensors, one or more tracking ID sensors, one or more laser scanners, etc., that may be a part of the tracking sensor assembly (e.g., 124, etc.) in the 3D space (126). These calibrations may be used to, but are not necessarily limited to only, enable the tracking device (122), or components/devices (e.g., a tracking controller, a spatial information analyzer etc.) therein, to (e.g., accurately, precisely, within relatively small errors, in real time, in near real time, etc.) track/monitor/determine/compute spatial coordinates of light sources of wearable devices (e.g., 102, 102-1 through 102-4, etc.) in the reference Cartesian coordinate system (or an equivalent reference coordinate system, an equivalent world coordinate system, etc.) stationary to the 3D space (126) at each time point in a plurality of time points over a time duration based on respective imagery positions of the light sources of the wearable devices (e.g., 102, 102-1 through 102-4, etc.) captured in device tracking images. In various embodiments, some or all of the calibrations can be performed before, at the same when, or after the wearable devices are used by their respective viewers.

6. Tracking Image Sensor Calibrations

Figure 3A:
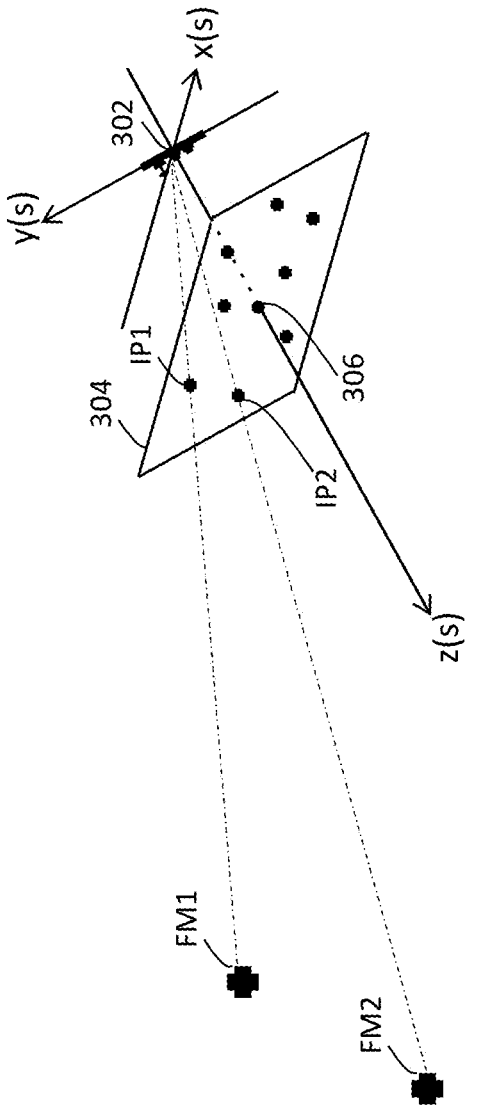
FIG. 3A illustrates example tracking image sensor calibrations.

FIG. 3A illustrates example calibrations of a tracking image sensor as described herein. By way of illustration but not limitation, the tracking image sensor may be an infrared camera, a laser scanner, a light sensor, etc.

A plurality of fiducial markers (e.g., FM1, FM2, etc.) may be deployed at different spatial positions in the 3D space (126). These fiducial markers (e.g., FM1, FM2, etc.) may emit, reflect or regenerate light rays such as infrared light, visible light, etc., that can be captured by the tracking image sensor to form one or more calibration images. In some embodiments, spatial coordinate values of the spatial position of each of the different fiducial markers (e.g., FM1, FM2, etc.) in reference to the reference Cartesian coordinate system stationary to the 3D space (126) are known or can be deduced from known positions of these fiducial markers (e.g., FM1, FM2, etc.) in the 3D space (126). As illustrated in FIG. 3A, the Cartesian reference coordinate system may comprise x, y and z axes and may be located at a specific spatial position or a coordinate origin in the 3D space (126).

Each of the one or more calibration images captured by the tracking image sensor may comprise a plurality of imagery points (e.g., IP1, IP2, etc.) representing image portions generated in response to the light rays from the plurality of fiducial markers. For example, a first imager point IP1 in the plurality of imagery points is an image portion generated in response to light rays from a first fiducial marker FM1 in the plurality of fiducial markers; a second imager point IP2 in the plurality of imagery points is an image portion generated in response to light rays from a second fiducial marker FM2 in the plurality of fiducial markers.

Some or all of spatial coordinate values of each of the imagery points in a sensor-specific coordinate system stationary to the tracking image sensor can be determined based on pixel locations of each such imagery point in the one or more calibration images. For the purpose of illustration only, the sensor-specific coordinate system may comprise $x(s)$, $y(s)$ and $z(s)$ axes and may have a coordinate system origin located at a center point 302 of the tracking image sensor, where the $z(s)$ axis represents an optical axis of the tracking image sensor, and where a plane formed by the $x(s)$ and $y(s)$ axes may be parallel to (or coplanar with) an image plane 304 of the tracking image sensor. In some embodiments, the center point (302) of the tracking image sensor may represent a focal point of a lens, aperture, and/or an optical stack, used by the tracking image sensor to collect incoming light rays, etc. Since the $x(s)$ and $y(s)$ form a plane parallel to the image plane (304), the pixel locations of an imagery point (e.g., IP1, etc.) in the one or more calibration images at the image plane (304) can be 1-1 mapped to $x(s)$ and $y(s)$ spatial coordinates for the imagery point in the sensor-specific coordinate system.

Based on the individual (e.g., known, deduced, etc.) spatial coordinates of each fiducial marker in the plurality of fiducial markers in the reference coordinate system and $x(s)$ and $y(s)$ spatial coordinates of each corresponding imagery point in the plurality of imagery points in the sensor-specific coordinate system, the device tracker (122) or the tracking sensor assembly (124) can generate a set of equations to determine a set of tracking image sensor parameters for the tracking image sensor. These tracking image sensor parameters may include, but are not necessarily limited to only, some or all of: spatial coordinate values (in the x, y and z axes of the reference coordinate system in the 3D space (126)) of the center point (302) at which the tracking image sensor (or its aperture) is located/centered; spatial coordinate values (in the $x(s)$, $y(s)$ and $z(s)$ axes of the sensor-specific coordinate system) of a principal point 306 at which the image plane (304) is located/centered; spatial coordinate values (in the x, y and z axes of the reference Cartesian coordinate system in the 3D space (126)) of the principal point (306); some or all of: a focal length of the tracking image sensor; pixel magnification factors; image skews; image radial distortions; a linear displacement/position of the sensor-specific coordinate system in reference to the reference Cartesian coordinate system in the 3D space (126); an angular displacement/position of the sensor-specific coordinate system in reference to the reference Cartesian coordinate system in the 3D space (126); etc.

Some or all of the foregoing calibrations for the tracking image sensor as described herein may be repeated to determine an individual set of tracking image sensor parameters for each other of some or all of the tracking image sensors and/or device ID sensors in the tracking sensor assembly (124).

7. Analyzing Tracking Images

Figure 3B:
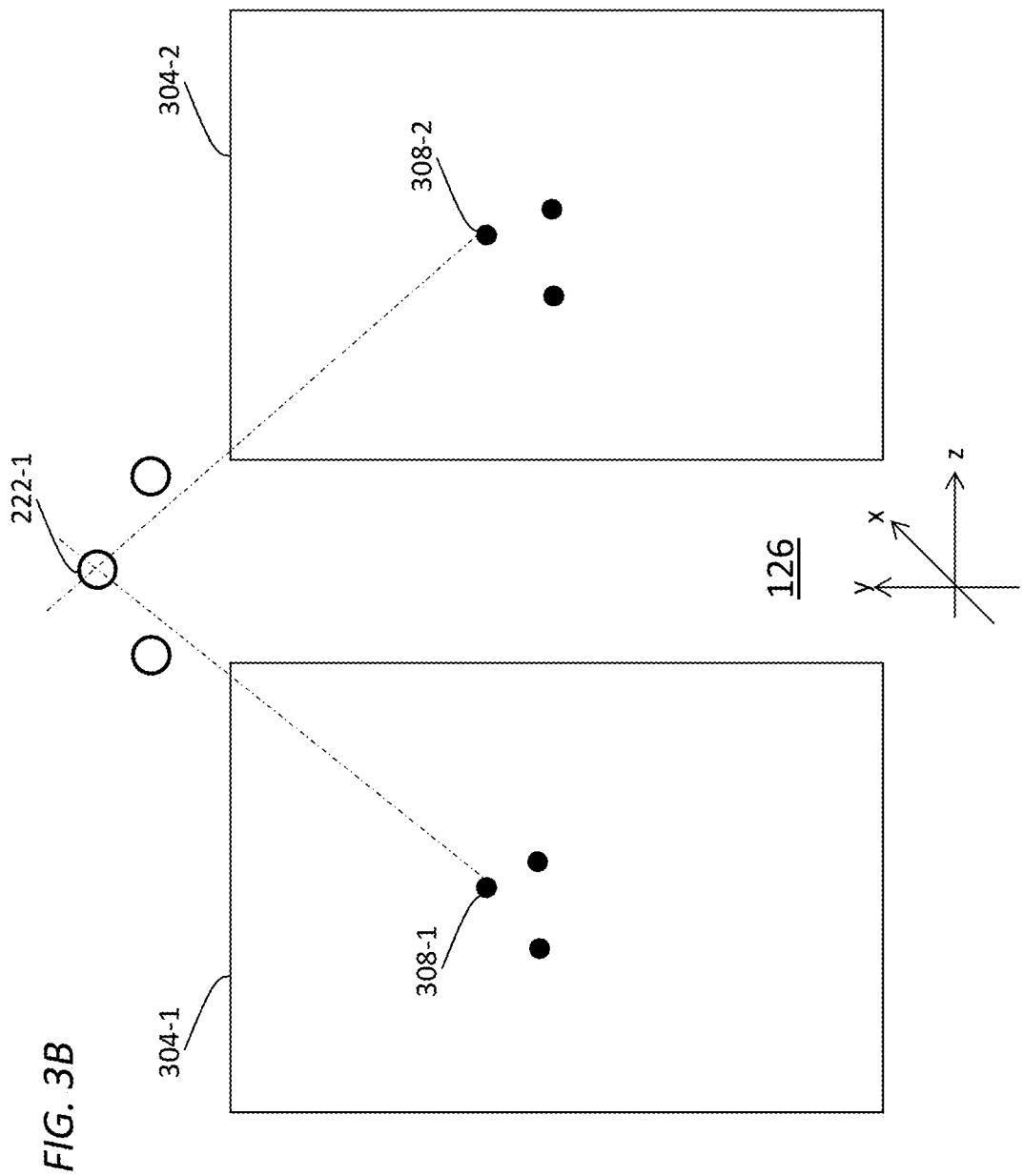
FIG. 3B illustrates an example determination of spatial coordinate values of a light source based on device tracking images.

FIG. 3B illustrates an example determination of spatial coordinate values of a light source (e.g., 222-1, etc.) based on a first device tracking image and a second device tracking image respectively captured by a first tracking image sensor and a second tracking image sensor in a tracking sensor assembly (e.g., 124, etc.) deployed in a 3D space (e.g., 126, etc.).

The first device tracking image and the second device tracking image may be represented as images respectively located (or mapped/represented) at a first image plane 304-1 of the first tracking image sensor and a second image plane 304-2 of the second tracking image sensor. The first image plane (304-1) of the first tracking image sensor may or may not be coplanar with the second image plane (304-2) of the second tracking image sensor. A first plurality of image points may be identified (e.g., through image analysis, through image morphological operations, through image filtering operations, etc.) from the first device tracking image. Similarly, a second plurality of image points may be identified (e.g., through image analysis, through image morphological operations, through image filtering operations, etc.) from the second device tracking image.

In some embodiments, a tracking device (e.g., 122, etc.) or the tracking sensor assembly (124) operating in conjunction with the tracking device (122) uses a first set of tracking image sensor parameters (e.g., as determined in image sensor calibrations as illustrated with FIG. 3A, etc.) for the first tracking image sensor to determine/compute an incoming light ray represented by or captured into each image point in the first plurality of image points in the first device tracking image. Thus, a first plurality of incoming light rays may be determined or computed; each individual incoming light ray in the first plurality of incoming light rays corresponds to a respective image point in the first plurality of image points in the first device tracking image.

In some embodiments, the tracking device (e.g., 122, etc.) or the tracking sensor assembly (124) uses a second set of tracking image sensor parameters (e.g., as determined in image sensor calibrations as illustrated with FIG. 3A, etc.) for the second tracking image sensor to determine/compute an incoming light ray represented by or captured into each image point in the second plurality of image points in the second device tracking image. Thus, a second plurality of incoming light rays may be determined or computed; each individual incoming light ray in the second plurality of incoming light rays corresponds to a respective image point in the second plurality of image points in the second device tracking image. Each light ray in the first plurality of light rays and the second plurality of light rays may be represented as a 3D line in a reference coordinate system (e.g., comprising x, y and z axes, etc.) in the 3D space (126).

In some embodiments, the tracking device (e.g., 122, etc.) or the tracking sensor assembly (124) determines or computes for each light ray in the first plurality of light rays, a corresponding light ray in the second plurality of light rays. The corresponding light ray in the second plurality of light rays may be identified in response to determining that the corresponding light ray intersects with each such light ray in the first plurality of light rays. Additionally, optionally or alternatively, the corresponding light rays in the second plurality of light rays may be identified in response to determining that the corresponding light ray, among all light rays in the second plurality of light rays, crosses with each such light ray in the first plurality of light rays at the nearest distance (with or without intersection).

In some embodiments, the tracking device (e.g., 122, etc.) or the tracking sensor assembly (124) determines or computes spatial coordinate values of the intersection of a light ray in the first plurality of light rays and a corresponding light ray in the second plurality of light rays in the reference Cartesian coordinate system in the 3D space (126). Additionally, optionally or alternatively, the tracking device (e.g., 122, etc.) or the tracking sensor assembly (124) determines or computes spatial coordinate values of an intermediate point (e.g., mid-point) of the nearest distance between a light ray in the first plurality of light rays and a corresponding light ray in the second plurality of light rays in the reference Cartesian coordinate system in the 3D space (126). These spatial coordinates may be represented using spatial coordinate values along the x, y and z axes of the reference coordinate system in the 3D space (126), and may be identified as spatial coordinate values of a light source (e.g., 222-1, etc.). This determination/calculation may be repeated for each light ray in the first plurality of light rays and each corresponding light ray in the second plurality of light rays. Thus, spatial coordinate values of each light source in a plurality of light sources in the reference Cartesian coordinate system in the 3D space (126) can be identified.

Based on the proximities or distances of light sources, the tracking device (e.g., 122, etc.) or the tracking sensor assembly (124) further determines a plurality of sets of light sources from the rest of the light sources. Each set of light sources in the plurality of sets may be determined/identified as belonging to a specific wearable device in one or more wearable devices in the 3D space (126).

Using spatial coordinate values of light sources (e.g., 222-1 through 222-3 of FIG. 2A or FIG. 2B, etc.) of a wearable device (e.g., 102, etc.) in the reference Cartesian coordinate system in the 3D space (126), the device tracker (122) can determine a specific spatial position and a specific spatial direction of the wearable device (102) in the reference Cartesian coordinate system in the 3D space (126).

In some embodiments, the device tracker (122) or a device controller (e.g., 128 of FIG. 1A, etc.) therein can direct/move one or more device ID sensors (e.g., using mechanical actuators, using optical filtering to allow a light signal receiver to zoom or focus on light rays from a particular image point or from a particular wearable device, etc.) to obtain one or more device ID signals based at least in part on spatial information of the wearable device (102) as derived from or represented by spatial coordinates of light sources (e.g., 222-1 through 222-3 of FIG. 2A or FIG. 2B, etc.) of a wearable device (e.g., 102, etc.).

For example, light rays from light sources present in the 3D space (126) may be split (e.g., by a beam splitter, etc.) into two light ray portions. A first light ray portion may be received by the device image sensors in the tracking sensor assembly (124) to form device tracking images. A second light ray portion from the beam splitter may be sent onto an optical path that goes through one or more light modulation layers before reaching the device ID sensors in the tracking sensor assembly (124).

Opacities and transmittances (or transmissivities) of the one or more light modulation layers may be set at individual pixel levels. The device tracker (122) can control the light modulation layers in the optical path between the light sources of the wearable device (102) and the one or more device ID sensors in the tracking sensor assembly (124) to filter out all light rays from other wearable devices other than the wearable device (102) from which device ID information is to be acquired and to allow only light rays from the light sources of the wearable device (102) to reach the one or more device ID sensors. The light rays received by the device ID sensors from the light sources of the wearable device (102) may be decoded by the device ID sensors, the tracking sensor assembly (124), and/or the device tracker (122), into device ID information for the wearable device (102).

8. Example Process Flows

FIG. 4 illustrates an example process flow according to an example embodiment of the present invention. In some example embodiments, one or more computing devices or components may perform this process flow. In block 402, at a first time point, a first light capturing device at a first spatial location in a three-dimensional (3D) space captures first light rays from a plurality of light sources located at a plurality of designated spatial locations on a viewer device in the 3D space.

In block 404, at the first time point, a second light capturing device at a second spatial location in the 3D space captures second light rays from the plurality of light sources located at the plurality of designated spatial locations on the viewer device in the 3D space.

In block 406, based on the first light rays captured by the first light capturing device and the second light rays captured by the second light capturing device, at least one of a spatial position and a spatial direction, at the first time point, of the viewer device is determined.

In an embodiment, the viewer device represents an eyewear device for viewing 3D image content.

In an embodiment, the viewer device represents a display device for one or more of: an augmented entertainment application, a virtual reality (VR) application, an augmented reality (AR) application, a remote presence application, a 3D display application, a telemedicine application, a game application, an automobile entertainment application, etc.

In an embodiment, the viewer device is represented at a virtual spatial location in a 3D image space depicted in video content; the virtual spatial location of the viewer device in the 3D image space is determined based on the spatial location and the spatial direction of the viewer device as determined based on the first light rays captured by the first light capturing device and the second light rays captured by the second light capturing device. In an embodiment, the video content as rendered on the viewer device is adapted specifically for the at least one of the spatial location and the spatial direction of the viewer device as determined based on the first light rays captured by the first light capturing device and the second light rays captured by the second light capturing device.

In an embodiment, the plurality of light sources comprises at least one light emitter.

In an embodiment, the plurality of light sources comprises at least one light reflector.

In an embodiment, each designated spatial location in the plurality of designated spatial locations of the light sources on the viewer device is spatially fixed on the viewer device.

In an embodiment, a third light capturing device captures third light rays from at least one light source in the plurality of light sources. Based on the third light rays captured by the third light capturing device, device ID information of the viewer device is identified. In an embodiment, the device ID information comprises a network address of the viewer device; the device ID information of the viewer device causes the viewer device to be registered with a video streaming server; the network address is used by the video streaming server to stream video content data to the viewer device. In an embodiment, the third light rays represent a digitally coded light signal. In an embodiment, the third light rays represent a spatially coded light signal. In an embodiment, the spatially coded light signal represents one of: a quick-response (QR) code, a barcode, a laser scanner code, another spatially coded pattern, etc.

In an embodiment, at least one of the first light capturing device and the second light capturing device represents an image sensor.

In an embodiment, the first light rays and the second light rays represent invisible light imperceptible to a human observer.

In an embodiment, the viewer device moves with up to six degrees of freedom.

In an embodiment, only the spatial position of the viewer device is determined based on the first light rays captured by the first light capturing device and the second light rays captured by the second light capturing device.

In an embodiment, only the spatial direction of the viewer device is determined based on the first light rays captured by the first light capturing device and the second light rays captured by the second light capturing device.

In an embodiment, the first light rays are captured by the first light capturing device in a first device tracking image; the second light rays are captured by the second light capturing device in a second device tracking image.

In an embodiment, the least one of the spatial position and the spatial direction of the viewer device is determined based on the first device tracking image and the second device tracking image.

In an embodiment, the least one of the spatial position and the spatial direction of the viewer device is determined based on spatial coordinate values of the light sources.

In an embodiment, the viewer device is among a plurality of viewer devices in the 3D space that are monitored in real time or in near real time by a device tracker operating in conjunction with the first light capturing device and the second light capturing device.

In an embodiment, a device tracker, comprising: a first light capturing device, at a first spatial location in a three-dimensional (3D) space, that captures, at a first time point, first light rays from a plurality of light sources located at a plurality of designated spatial locations on a viewer device in the 3D space; a second light capturing device, at a second spatial location in the 3D space, that captures, at the first time point, second light rays from the plurality of light sources located at the plurality of designated spatial locations on the viewer device in the 3D space; the device tracker determines at least one of a spatial position and a spatial direction, at the first time point, of the viewer device based on the first light rays captured by the first light capturing device and the second light rays captured by the second light capturing device.

In various example embodiments, an apparatus, a system, an apparatus, or one or more other computing devices performs any or a part of the foregoing methods as described. In an embodiment, a non-transitory computer readable storage medium stores software instructions, which when executed by one or more processors cause performance of a method as described herein.

Note that, although separate embodiments are discussed herein, any combination of embodiments and/or partial embodiments discussed herein may be combined to form further embodiments.

9. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
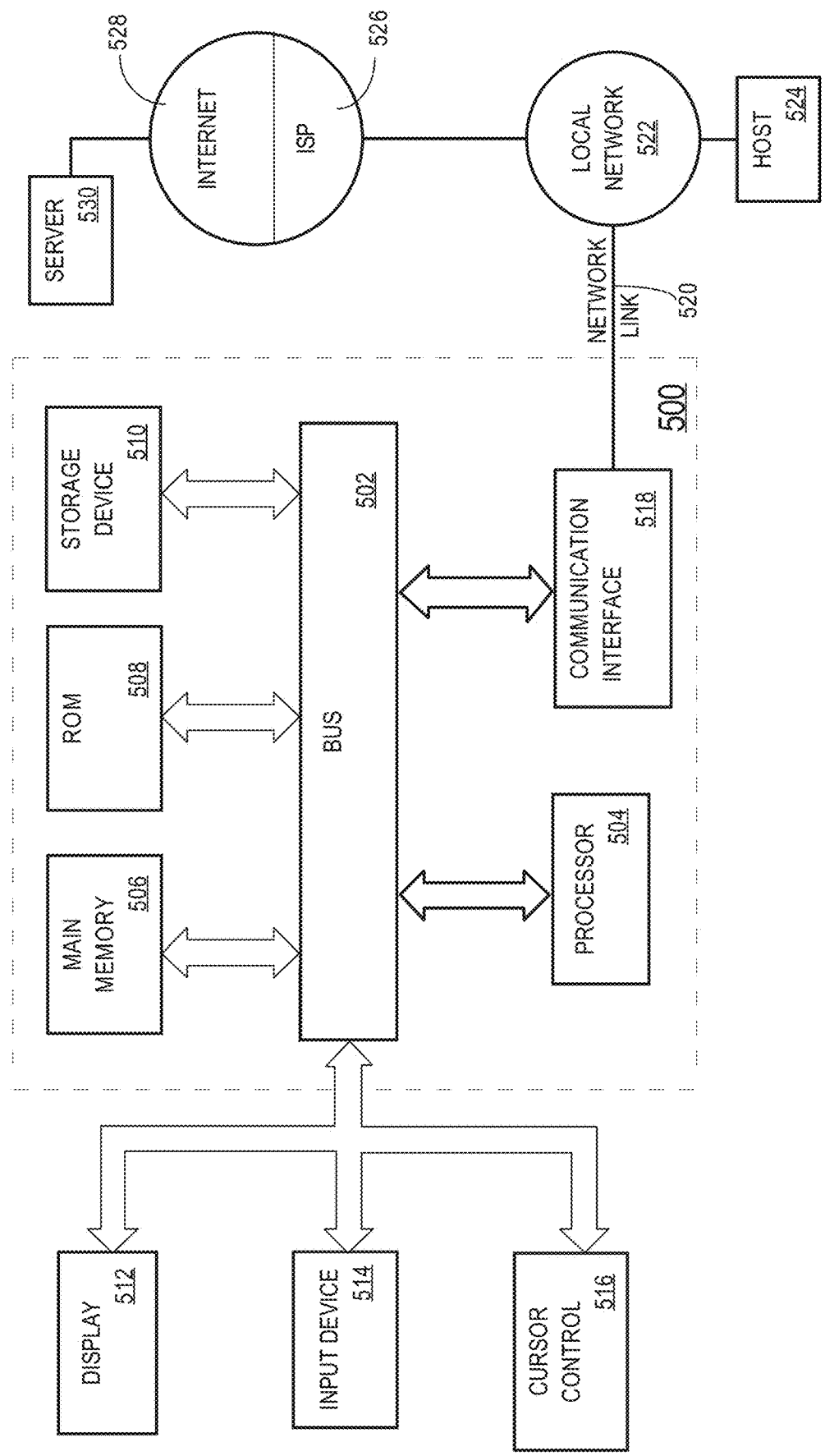
FIG. 5 illustrates an example hardware platform on which a computer or a computing device as described herein may be implemented.

For example, FIG. 5 is a block diagram that illustrates a computer system 500 upon which an example embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504.

A storage device 510, such as a magnetic disk or optical disk, solid state RAM, is provided and coupled to bus 502 for storing information and instructions.

Computer system 500 may be coupled via bus 502 to a display 512, such as a liquid crystal display, for displaying information to a computer viewer. An input device 514, including alphanumeric and other keys, is coupled to bus 502 for communicating information and command selections to processor 504. Another type of viewer input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

10. Equivalents, Extensions, Alternatives and Miscellaneous

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
   capturing, at a first time point by a first light capturing device at a first spatial location in a three-dimensional (3D) space, first light rays from a plurality of light sources located at a plurality of designated spatial locations on a viewer device in the 3D space;
   capturing, at the first time point by a second light capturing device at a second spatial location in the 3D space, second light rays from the plurality of light sources located at the plurality of designated spatial locations on the viewer device in the 3D space;
   based on the first light rays captured by the first light capturing device and the second light rays captured by the second light capturing device, determining at least one of a spatial position and a spatial direction, at the first time point, of the viewer device.

2. The method of claim 1, wherein the viewer device represents an eyewear device for viewing 3D image content.

3. The method of claim 1, wherein the viewer device represents a display device for one or more of: an augmented entertainment application, a virtual reality (VR) application, an augmented reality (AR) application, a remote presence application, a 3D display application, a telemedicine application, a game application, or an automobile entertainment application.

4. The method of claim 1, wherein the viewer device is represented at a virtual spatial location in a 3D image space depicted in video content; and wherein the virtual spatial location of the viewer device in the 3D image space is determined based on the spatial location and the spatial direction of the viewer device as determined based on the first light rays captured by the first light capturing device and the second light rays captured by the second light capturing device.

5. The method of claim 4, wherein the video content as rendered on the viewer device is adapted specifically for the at least one of the spatial location and the spatial direction of the viewer device as determined based on the first light rays captured by the first light capturing device and the second light rays captured by the second light capturing device.

6. The method of claim 1, wherein the plurality of light sources comprises at least one light emitter.

7. The method of claim 1, wherein the plurality of light sources comprises at least one light reflector.

8. The method of claim 1, wherein each designated spatial location in the plurality of designated spatial locations of the light sources on the viewer device is spatially fixed on the viewer device.

9. The method of claim 1, further comprising:
   capturing, by a third light capturing device, third light rays from at least one light source in the plurality of light sources;
   identifying, based on the third light rays captured by the third light capturing device, device ID information of the viewer device.

10. The method of claim 9, wherein the device ID information comprises a network address of the viewer device; wherein the device ID information of the viewer device causes the viewer device to be registered with a video streaming server; wherein the network address is used by the video streaming server to stream video content data to the viewer device.

11. The method of claim 9, wherein the third light rays represent a digitally coded light signal.

12. The method of claim 9, wherein the third light rays represent a spatially coded light signal.

13. The method of claim 12, wherein the spatially coded light signal represents one of: a quick-response (QR) code, a barcode, a laser scanner code, or another spatially coded pattern.

14. The method of claim 1, wherein at least one of the first light capturing device and the second light capturing device represents an image sensor.

15. The method of claim 1, wherein the first light rays and the second light rays represent invisible light imperceptible to a human observer.

16. The method of claim 1, where the viewer device moves with up to six degrees of freedom.

17. The method of claim 1, wherein only the spatial position of the viewer device is determined based on the first light rays captured by the first light capturing device and the second light rays captured by the second light capturing device.

18. The method of claim 1, wherein only the spatial direction of the viewer device is determined based on the first light rays captured by the first light capturing device and the second light rays captured by the second light capturing device.

19. The method of claim 1, wherein the first light rays are captured by the first light capturing device in a first device tracking image; wherein the second light rays are captured by the second light capturing device in a second device tracking image.

20. The method of claim 19, wherein the least one of the spatial position and the spatial direction of the viewer device is determined based on the first device tracking image and the second device tracking image.

21. The method of claim 1, wherein the least one of the spatial position and the spatial direction of the viewer device is determined based on spatial coordinate values of the light sources.

22. The method of claim 1, wherein the viewer device is among a plurality of viewer devices in the 3D space that are monitored in real time or in near real time by a device tracker operating in conjunction with the first light capturing device and the second light capturing device.

23. A device tracker, comprising:
- a first light capturing device, at a first spatial location in a three-dimensional (3D) space, that captures, at a first time point, first light rays from a plurality of light sources located at a plurality of designated spatial locations on a viewer device in the 3D space;
- a second light capturing device, at a second spatial location in the 3D space, that captures, at the first time point, second light rays from the plurality of light sources located at the plurality of designated spatial locations on the viewer device in the 3D space;
- wherein the device tracker determines at least one of a spatial position and a spatial direction, at the first time point, of the viewer device based on the first light rays captured by the first light capturing device and the second light rays captured by the second light capturing device.

* * * * *